United States Patent
Purvis et al.

(10) Patent No.: US 12,362,987 B1
(45) Date of Patent: Jul. 15, 2025

(54) ACCESS POINT HEALTH METRICS

(71) Applicant: Juniper Networks, Inc., Sunnyvale, CA (US)

(72) Inventors: Wesley Purvis, Yardley, PA (US); Jisheng Wang, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/502,676

(22) Filed: Nov. 6, 2023

Related U.S. Application Data

(60) Provisional application No. 63/478,027, filed on Dec. 30, 2022.

(51) Int. Cl.
*H04L 41/0654* (2022.01)
*H04L 41/0631* (2022.01)
*H04L 41/0677* (2022.01)

(52) U.S. Cl.
CPC ...... *H04L 41/0654* (2013.01); *H04L 41/0631* (2013.01); *H04L 41/0677* (2013.01)

(58) Field of Classification Search
CPC ............. H04L 41/0654; H04L 41/0631; H04L 41/0677
See application file for complete search history.

(56) References Cited

U.S. PATENT DOCUMENTS

| | | |
|---|---|---|
| 9,729,439 B2 | 8/2017 | MeLampy et al. |
| 9,729,682 B2 | 8/2017 | Kumar et al. |
| 9,762,485 B2 | 9/2017 | Kaplan et al. |
| 9,832,082 B2 | 11/2017 | Dade et al. |
| 9,871,748 B2 | 1/2018 | Gosselin et al. |
| 9,985,883 B2 | 5/2018 | MeLampy et al. |
| 10,200,264 B2 | 2/2019 | Menon et al. |
| 10,277,506 B2 | 4/2019 | Timmons et al. |
| 10,432,522 B2 | 10/2019 | Kaplan et al. |
| 10,756,983 B2 | 8/2020 | Ratkovic et al. |
| 10,807,591 B1* | 10/2020 | Kentley-Klay ........ G08B 21/10 |
| 10,862,742 B2 | 12/2020 | Singh |
| 10,958,537 B2 | 3/2021 | Safavi |
| 10,958,585 B2* | 3/2021 | Safavi ................. H04L 41/0677 |
| 10,985,969 B2* | 4/2021 | Safavi ................. H04L 41/0631 |
| 10,992,543 B1 | 4/2021 | Rachamadugu et al. |
| 11,075,824 B2 | 7/2021 | McCulley et al. |
| 11,700,186 B1* | 7/2023 | Mehra ................. H04L 41/5019 709/224 |
| 2018/0224844 A1* | 8/2018 | Zhang ................. H04L 67/1097 |
| 2019/0379577 A1* | 12/2019 | Tiwari ................. H04L 41/0654 |
| 2020/0166924 A1* | 5/2020 | Pedersen ................. B60Q 1/507 |

(Continued)

*Primary Examiner* — Richard G Keehn
(74) *Attorney, Agent, or Firm* — Shumaker & Sieffert, P.A.

(57) ABSTRACT

A network management system (NMS) configured to attribute a health issue of an access point (AP) to a classifier or sub-classifier and remedy the health affecting a user's experience. The NMS obtains network data associated with an AP device of a site. The NMS also determines whether the network data satisfies one or more criteria corresponding to a classifier of a service level expectation (SLE) metric for determining a health issue of the AP device. In response to determining the network data does not satisfy the criteria associated with the classifier, NMS attributes the health issue of the AP device to the classifier. In response to attributing the health issue of the AP device to the classifier, NMS performs a remedy action based on the classifier.

20 Claims, 9 Drawing Sheets

(56) References Cited

U.S. PATENT DOCUMENTS

| | | | |
|---|---|---|---|
| 2020/0236008 A1* | 7/2020 | Safavi | H04L 41/149 |
| 2020/0309543 A1* | 10/2020 | Voznesensky | G01C 21/3407 |
| 2021/0049904 A1* | 2/2021 | Zavesky | G08G 1/096783 |
| 2021/0058933 A1* | 2/2021 | Jetcheva | H04L 41/12 |
| 2021/0231447 A1* | 7/2021 | Ahmed | G06N 20/00 |
| 2021/0306201 A1 | 9/2021 | Wang et al. | |
| 2023/0125903 A1 | 4/2023 | Kozin et al. | |
| 2023/0391363 A1* | 12/2023 | Yang | G01C 21/3438 |
| 2024/0220914 A1* | 7/2024 | Bonafe | G06Q 10/0833 |

* cited by examiner

ACCESS POINT HEALTH METRICS

This application claims priority to U.S. Provisional Patent Application No. 63/478,027, filed 30 Dec. 2022, the entire contents of which is incorporated herein by reference.

TECHNICAL FIELD

The disclosure relates generally to computer networks and, more specifically, to monitoring and control of wireless or wired networks.

BACKGROUND

Commercial premises, such as offices, hospitals, airports, stadiums, or retail outlets, often install complex wireless network systems, including a network of wireless access points (APs), throughout the premises to provide wireless network services to one or more wireless client devices. The APs may enable the wireless client devices to wirelessly connect to a wired network using various wireless networking protocols and technologies, such as wireless local area networking protocols conforming to one or more of the IEEE 802.11 standards (i.e., "Wi-Fi"), Bluetooth/Bluetooth Low Energy (BLE), mesh networking protocols such as ZigBee, and/or other wireless networking technologies. The wireless client devices (also referred to herein as "wireless devices") include mobile computing devices such as smartphones, tablet computers, laptop computers, and wearable devices (e.g., smart watches, smart rings, etc.), wireless printers, wireless Internet of Things (IoT) devices, and any other device configured to communicate over a wireless network. Wired client devices include any device connected directly to a wired network such as APs, printers, appliances, wired IoT devices, etc.

SUMMARY

In general, this disclosure describes one or more techniques for a network management system (NMS) to monitor and evaluate the health of one or more access points (APs) in a wireless network based on one or more AP health service level expectation (SLE) metrics. For example, the NMS may include an AP assurance engine configured to automatically monitor and evaluate AP health SLE metrics associated with the health of AP devices, such as whether one or more of APs in the wireless network are unreachable, disconnected, or any other issue affecting a user's network experience, and classify detected issues that can be used to determine the scope of impact and/or root cause of the issues.

The techniques may provide one or more technical advantages that realize one or more practical applications. For example, a network management system may automatically identify, with varying levels of particularity, a health issue of an access point (AP) device. The network management system may effectively and efficiently classify health issues of AP devices based on network data associated with an AP device. For example, the network management system may use AP health SLE metrics to classify network data indicative of particular AP health issues. In this way, the network management system may enable automatic and/or expedited identification and/or remediation of a health issue. The network management system may use classifications of AP health SLE metrics to intelligently take remedial actions, notify an administrator of a root cause of a health issue, and/or recommend the administrator take remedial actions associated with classifiers attributed to a particular AP device health issue.

In one example, a network management system may include one or more processors and a memory comprising instructions that, when executed by the one or more processors, cause the one or more processors to obtain network data associated with an access point (AP) device of a site. The instructions may further cause the one or more processors to determine whether the network data satisfies one or more criteria corresponding to a classifier of a service level expectation (SLE) metric for determining a health issue of the AP device, wherein the criteria corresponding to the classifier specifies an expected level of service to be provided by the AP device. The instructions may further cause the one or more processors to attribute the health issue of the AP device to the classifier based on determining whether the network data satisfies the criteria associated with the classifier. The instructions may further cause the one or more processors to perform a remedial action based on the classifier in response to attributing the health issue of the AP device to the classifier.

In another example, a method includes obtaining, by a network management system (NMS), network data associated with an access point (AP) device of a site. obtaining, by a network management system (NMS), network data associated with an access point (AP) device of a site. The method may further include determining, by the NMS, whether the network data satisfies one or more criteria corresponding to a classifier of a service level expectation (SLE) metric for determining a health issue of the AP device. The method may further include based on determining whether the network data satisfies the criteria associated with the classifier, attributing, by the NMS, the health issue of the AP device to the classifier. The method may further include in response to attributing the health issue of the AP device to the classifier, performing, by the NMS, a remedial action based on the classifier.

In another example, computer-readable storage medium may include instructions that, when executed by processing circuitry, cause the processing circuitry to obtain network data associated with an access point (AP) device of a site. The instructions may further cause the processing circuitry to determine whether the network data satisfies one or more criteria corresponding to a classifier of a service level expectation (SLE) metric for determining a health issue of the AP device, wherein the criteria corresponding to the classifier specifies an expected level of service to be provided by the AP device. The instructions may further cause the processing circuitry to attribute the health issue of the AP device to the classifier based on determining whether the network data satisfies the criteria associated with the classifier. The instructions may further cause the processing circuitry to perform a remedial action based on the classifier in response to attributing the health issue of the AP device to the classifier.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
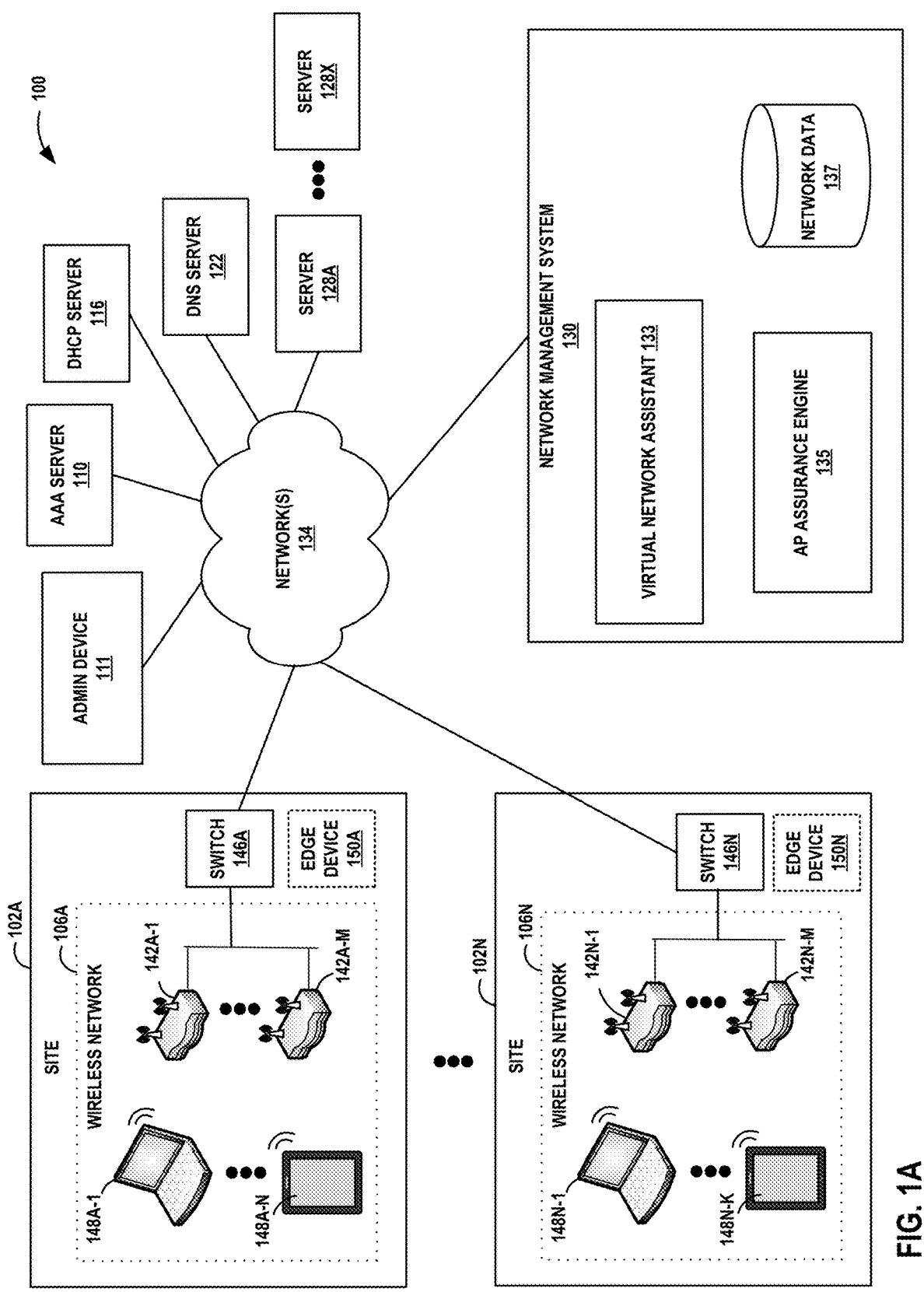
FIG. 1A is a diagram of an example network system in which a network management system determines one or more health metrics for access points, in accordance with one or more techniques of the disclosure.

FIG. 1A is a block diagram of an example network system 100 including network management system (NMS) 130 configured to determine one or more health metrics for access points, in accordance with one or more techniques of this disclosure. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Each site 102A-102N includes a plurality of network access server (NAS) devices, such as access points (APs) 142 (also referred herein as "AP devices 142"), switches 146, or routers (not shown). For example, site 102A includes a plurality of APs 142A-1 through 142A-M. Similarly, site 102N includes a plurality of APs 142N-1 through 142N-M. Each AP 142 may be any type of wireless access point, including, but not limited to, a commercial or enterprise AP, a router, or any other device that is connected to a wired network and is capable of providing wireless network access to client devices within the site.

Each site 102A-102N also includes a plurality of client devices, otherwise known as user equipment devices (UEs), referred to generally as UEs or client devices 148, representing various wireless-enabled devices within each site. For example, a plurality of UEs 148A-1 through 148A-N are currently located at site 102A. Similarly, a plurality of UEs 148N-1 through 148N-K are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring, or other wearable device. UEs 148 may also include wired client-side devices, e.g., IoT devices such as printers, security devices, environmental sensors, or any other device connected to the wired network and configured to communicate over one or more wireless networks 106.

In order to provide wireless network services to UEs 148 and/or communicate over the wireless networks 106, APs 142 and the other wired client-side devices at sites 102 are connected, either directly or indirectly, to one or more network devices (e.g., switches, routers, or the like) via physical cables, e.g., Ethernet cables. Ethernet cables are connected to ports having dedicated speeds (e.g., 10 mbps, 100 mbps, 1000 mbps, etc.). In the example of FIG. 1A, site 102A includes a switch 146A to which each of APs 142A-1 through 142A-M at site 102A are connected. Similarly, site 102N includes a switch 146N to which each of APs 142N-1 through 142N-M at site 102N are connected. Although illustrated in FIG. 1A as if each site 102 includes a single switch 146 and all APs 142 of the given site 102 are connected to the single switch 146, in other examples, each site 102 may include more or fewer switches and/or routers. In addition, the APs and the other wired client-side devices of the given site may be connected to two or more switches and/or routers. In addition, two or more switches at a site may be connected to each other and/or connected to two or more routers, e.g., via a mesh or partial mesh topology in a hub-and-spoke architecture. In some examples, interconnected switches and routers comprise wired local area networks (LANs) at sites 102 hosting wireless networks 106.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128A-128X (collectively "servers 128") (e.g., web servers, databases servers, file servers, and the like), and a network management system (NMS) 130. As shown in FIG. 1A, the various devices and systems of network 100 are coupled together via one or more network(s) 134, e.g., the Internet and/or an enterprise intranet.

In the example of FIG. 1A, NMS 130 is a cloud-based computing platform that manages wireless networks 106A-106N at one or more of sites 102A-102N. As further described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. In some examples, NMS 130 outputs notifications, such as alerts, alarms, graphical indicators on dashboards, log messages, text/SMS messages, email messages, and the like, and/or recommendations regarding wireless network issues to a site or network administrator ("admin") interacting with and/or operating admin device 111. Additionally, in some examples, NMS 130 operates in response to configuration input received from the administrator interacting with and/or operating admin device 111.

The administrator and admin device 111 may comprise IT personnel and an administrator computing device associated with one or more of sites 102. Admin device 111 may be implemented as any suitable device for presenting output and/or accepting user input. For instance, admin device 111 may include a display. Admin device 111 may be a computing system, such as a mobile or non-mobile computing device operated by a user and/or by the administrator. Admin device 111 may, for example, represent a workstation, a laptop or notebook computer, a desktop computer, a tablet computer, or any other computing device that may be operated by a user and/or present a user interface in accordance with one or more aspects of the present disclosure. Admin device 111 may be physically separate from and/or in a different location than NMS 130 such that admin device 111 may communicate with NMS 130 via network 134 or other means of communication.

In some examples, one or more of the NAS devices, e.g., APs 142, switches 146, or routers, may connect to edge devices 150A-150N via physical cables, e.g., Ethernet cables. Edge devices 150 comprise cloud-managed, wireless local area network (LAN) controllers. Each of edge devices 150 may comprise an on-premises device at a site 102 that is in communication with NMS 130 to extend certain microservices from NMS 130 to the on-premises NAS devices while using NMS 130 and its distributed software architecture for scalable and resilient operations, management, troubleshooting, and analytics. In some examples, NAS devices may establish tunnels to edge devices 150, such as a Layer Two Tunneling Protocol Version 3 (L2TPv3) tunnel.

Each one of the network devices of network system 100, e.g., servers 110, 116, 122 and/or 128, APs 142, UEs 148, switches 146, and any other servers or devices attached to or forming part of network system 100, may include a system log or an error log module wherein each one of these network devices records the status of the network device including normal operational status and error conditions. Throughout this disclosure, one or more of the network devices of network system 100, e.g., servers 110, 116, 122 and/or 128, APs 142, UEs 148, and switches 146, may be considered "third-party" network devices when owned by and/or associated with a different entity than NMS 130 such that NMS 130 does not receive, collect, or otherwise have access to the recorded status and other data of the third-party network devices. In some examples, edge devices 150 may provide a proxy through which the recorded status and other data of the third-party network devices may be reported to NMS 130.

In some examples, NMS 130 monitors network data of network devices of network system 100, e.g., one or more service level expectation (SLE) metrics, received from wireless networks 106A-106N at each site 102A-102N, respectively, and manages network resources, such as APs 142 at each site, to deliver a high-quality wireless experience to end users, IoT devices and clients at the site. Network data may be stored, for example, in a database of NMS 130, e.g., network data 137. For example, NMS 130 may include a virtual network assistant (VNA) 133 that implements an event processing platform for providing real-time insights and simplified troubleshooting for IT operations, and that automatically takes corrective action or provides recommendations to proactively address wireless network issues. VNA 133 may, for example, include an event processing platform configured to process hundreds or thousands of concurrent streams of network data 137 from sensors and/or agents associated with APs 142 and/or nodes within network 134. For example, VNA 133 of NMS 130 may include an underlying analytics and network error identification engine and alerting system in accordance with various examples described herein. The underlying analytics engine of VNA 133 may apply historical data and models to the inbound event streams to compute assertions, such as identified anomalies or predicted occurrences of events constituting network error conditions. Further, VNA 133 may provide real-time alerting and reporting to notify a site or network administrator via admin device 111 of any predicted events, anomalies, trends, and may perform root cause analysis and automated or assisted error remediation. In some examples, VNA 133 of NMS 130 may apply machine learning techniques to identify the root cause of error conditions detected or predicted from the streams of network data 137. If the root cause may be automatically resolved, VNA 133 may invoke one or more corrective actions to correct the root cause of the error condition, thus automatically improving the underlying AP health SLE metrics and also automatically improving the user experience.

Further example details of operations implemented by the VNA 133 of NMS 130 are described in U.S. Pat. No. 9,832,082, issued Nov. 28, 2017, and entitled "Monitoring Wireless Access Point Events," U.S. Publication No. US 2021/0306201, published Sep. 30, 2021, and entitled "Network System Fault Resolution Using a Machine Learning Model," U.S. Pat. No. 10,985,969, issued Apr. 20, 2021, and entitled "Systems and Methods for a Virtual Network Assistant," U.S. Pat. No. 10,958,585, issued Mar. 23, 2021, and entitled "Methods and Apparatus for Facilitating Fault Detection and/or Predictive Fault Detection," U.S. Pat. No. 10,958,537, issued Mar. 23, 2021, and entitled "Method for Spatio-Temporal Modeling," and U.S. Pat. No. 10,862,742, issued Dec. 8, 2020, and entitled "Method for Conveying AP Error Codes Over BLE Advertisements," all of which are incorporated herein by reference in their entirety.

In operation, NMS 130 observes, collects and/or receives network data 137, which may take the form of data extracted from messages, counters, and statistics, for example. In accordance with one specific implementation, a computing device is part of NMS 130. In accordance with other implementations, NMS 130 may comprise one or more computing devices, dedicated servers, virtual machines, containers, services, or other forms of environments for performing the techniques described herein. Similarly, computational resources and components implementing VNA 133 may be part of the NMS 130, may execute on other servers or execution environments, or may be distributed to nodes within network 134 (e.g., routers, switches, controllers, gateways, and the like).

In accordance with one or more techniques of this disclosure, NMS 130 is configured to monitor and evaluate the health of one or more APs 142 of network sites 102. For example, AP assurance engine 135 of NMS 130 may automatically monitor and evaluate AP health SLE metrics associated with the health of AP devices, such as whether one or more of APs 142 are unreachable, disconnected, or any other issue, and classify the detected issues to determine the scope of impact and/or root cause of the issues.

As one example, AP assurance engine 135 obtains network data of UEs 148 and/or NAS devices of sites 102, such as AP devices 142, switches 146, or any other devices. In some instances, AP assurance engine 135 may obtain network data 137 of UEs 148 and/or NAS devices in a continuous basis, periodic basis (e.g., one-minute intervals), event-driven basis, or other type of basis. Network data 137 may include information associated an AP device, such as information indicative of the power, Ethernet accessibility, tunneling, network performance (e.g., latency, jitter, etc.), AP connectivity (e.g., AP uptime), and/or any other information associated with APs 142 and their connectivity to UEs 148 and/or network devices of sites 102 that may impact user experience. For example, network data 137 may include information associated with pre-connection and/or post-connection failures that prevent UE access to network 134.

AP assurance engine 135 may perform one or more assessments to network data 137 to detect any health issues. For example, AP assurance engine 135 may determine whether network data 137 satisfies one or more configurable criteria (e.g., threshold) associated with one or more classifiers or sub-classifiers associated with a service level expectation (referred to herein as "AP health SLE"), and if network data 137 does not satisfy the criteria (e.g., network data 137 is below performance expectations and thus a detected health issue), AP assurance engine 135 may attribute the detected health issue to the one or more classifiers or sub-classifiers indicative of a corresponding, unsatisfactory AP health SLE (e.g., assign the one or more classifiers or sub-classifiers to the AP device). As further described below, AP health SLE may include a low power classifier to classify issues caused by low power of an AP, an Ethernet access classifier to classify issues with Ethernet accessibility, a network classifier to classify issues with network performance and availability, and an AP uptime classifier to classify issues caused by an AP being down, disconnected, or otherwise unreachable. In some examples, the classifiers may include one or more sub-classifiers to provide further granularity in classifying the issues. For example, the low power classifier may include a sub-classifier to classify a low power issue where the AP does not have sufficient power to power a wireless transmitter, a sub-classifier to classify a low power issue where the AP does not have sufficient power to supply power to Power over Ethernet (PoE) devices, and/or other sub-classifiers that provide further granularity in classifying low power issue of the AP. The Ethernet access classifier may include a sub-classifier to classify a speed mismatch issue, a sub-classifier to classify an Ethernet connection issue, and/or other sub-classifiers that provide further granularity in classifying an Ethernet access issue. The network classifier may include a sub-classifier to classify a latency issue, a sub-classifier to classify a jitter issue, a sub-classifier to classify a tunnel disconnected issue, and/or other sub-classifiers that provide further granularity in classifying an Ethernet connection issue. The AP uptime classifier may include a sub-classifier to classify an issue related to the AP being unreachable, a sub-classifier to classify an issue related to a switching being down, a sub-classifier to classify an issue related to a site being down, a sub-classifier to classify an issue related to the AP needing a reboot, and/or other sub-classifiers that provide further granularity in classifying an AP uptime issue. Each classifier or sub-classifier corresponds to respective criteria that is used to determine a scope of impact caused by the health issue and/or to further determine a root cause of the health issue, as discussed in more detail herein.

The techniques of this disclosure provide one or more technical advantages and practical applications. For example, the techniques enable the NMS to automatically monitor and classify AP performance associated with a wireless network based on one or more AP health SLE metrics. The AP health SLE metrics account for one or more factors that may affect determinations of AP health issues for AP devices associated with a wireless network. In this way, the AP health SLE metrics may be used to classify and/or monitor one or more factors that may affect the perceived quality of AP services provided to the customer of a wireless service provider or to wireless client devices associated with the wireless network. For example, the techniques may determine an AP health SLE metric corresponding to a particular classifier (e.g., low power classifier) that is used to classify, based on network data obtained from devices in network system 100, the performance of an AP that may be indicative of particular issues caused by or attributed to the AP that may affect user experience in accessing the network. The techniques therefore enable the NMS to proactively monitor and classify AP health associated with a wireless network. Based on the one or more AP health SLE metrics, the NMS may further identify anomalies in an AP device, identify a root cause of one or more anomalies, automatically generate one or more notifications including recommended actions that may be taken to address the root cause of the anomalies, and/or automatically invoke one or more remedial actions intended to address the identified anomalies. In this way, the techniques of this disclosure may enhance the identification and remediation of a network's health, thus enhancing the user experience of one or more network services provided to client devices associated with the wireless network.

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 1B:
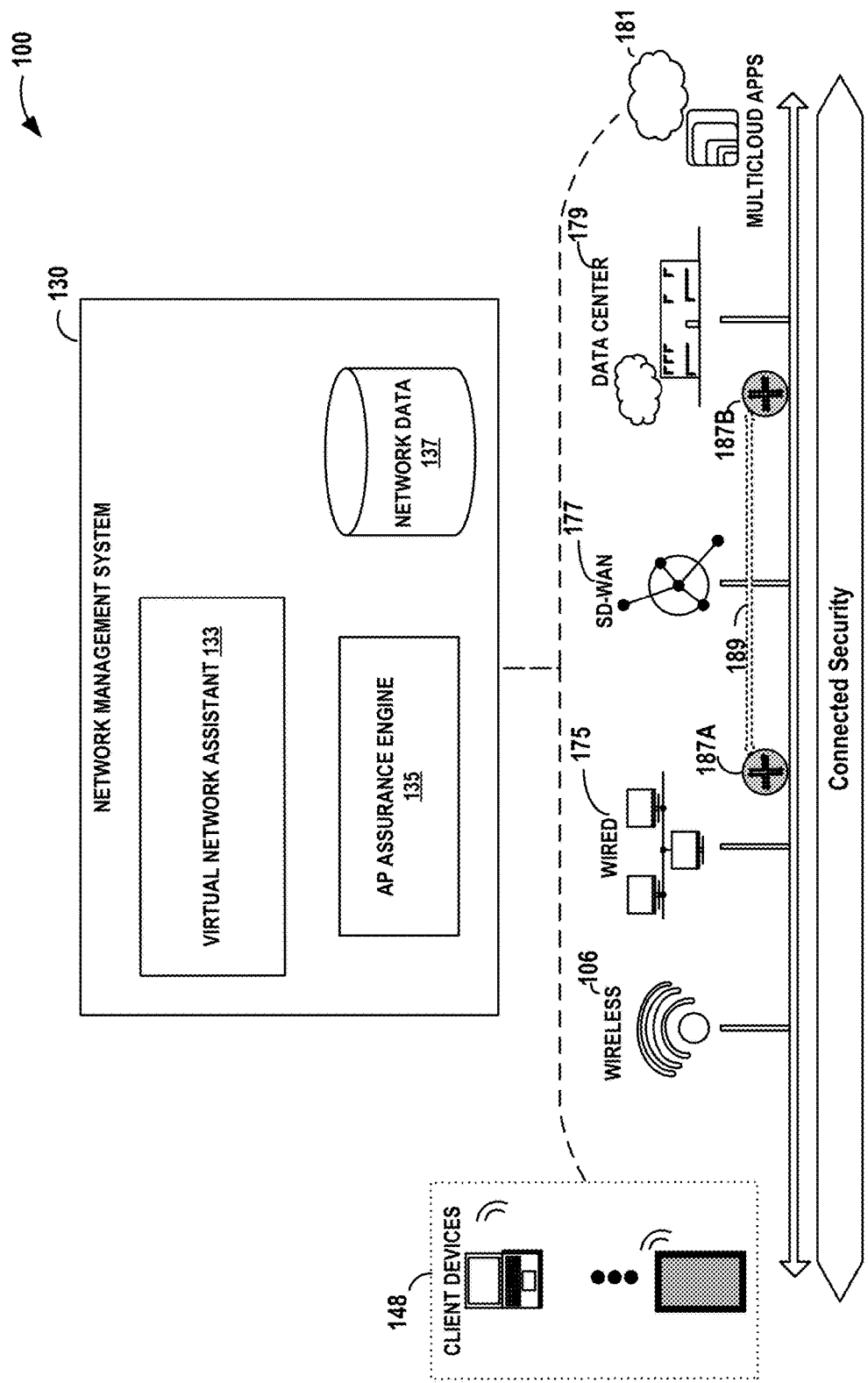
FIG. 1B is a block diagram illustrating further example details of the network system of FIG. 1A.

FIG. 1B is a block diagram illustrating further example details of the network system of FIG. 1A. In this example, FIG. 1B illustrates NMS 130 configured to operate according to an artificial intelligence/machine-learning-based computing platform providing comprehensive automation, insight, and assurance (WiFi Assurance, Wired Assurance and WAN assurance) spanning from "client," e.g., user devices 148 connected to wireless network 106 and wired LAN 175 (far left of FIG. 1B), to "cloud," e.g., cloud-based application services 181 that may be hosted by computing resources within data centers 179 (far right of FIG. 1B).

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-driven radio frequency (RF) optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by client devices 148 to steer traffic along selected paths, e.g., path 189, toward application services 181 without requiring use of tunnels and/or additional labels. In this way, routers 187A, 187B may be more efficient and scalable for large networks since the use of tunnel-less, session-based routing may enable routers 187A, 187B to achieve considerable network resources by obviating the need to perform encapsulation and decapsulation at tunnel endpoints. Moreover, in some examples, each router 187A, 187B may independently perform path selection and traffic engineering to control packet flows associated with each session without requiring use of a centralized SDN controller for path selection and label distribution. In some examples, routers 187A, 187B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Pat. No. 11,075,824, entitled "IN-LINE PERFORMANCE MONITORING," and issued on Jul. 27, 2021, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

As described above and in accordance with the techniques described in this disclosure, NMS 130 is configured to monitor and evaluate the health of one or more APs in a wireless network, such as wireless networks 106, based on one or more AP health SLE metrics. The AP health SLE metrics may be determined on an AP-level or a site-level, for example. Each AP health SLE metric may further be attributed to a health issue corresponding to one or more classifiers or sub-classifiers. Each of the AP health SLE metrics may be associated with customized criteria for a particular wireless network or customer site. If any network data obtained by NMS 130 does not meet their respective criteria associated with the corresponding AP health SLE metrics for the site, the failure may be attributed to health issues identified by the one or more classifiers or sub-classifiers to further understand how and/or why the failure occurred.

Figure 2:
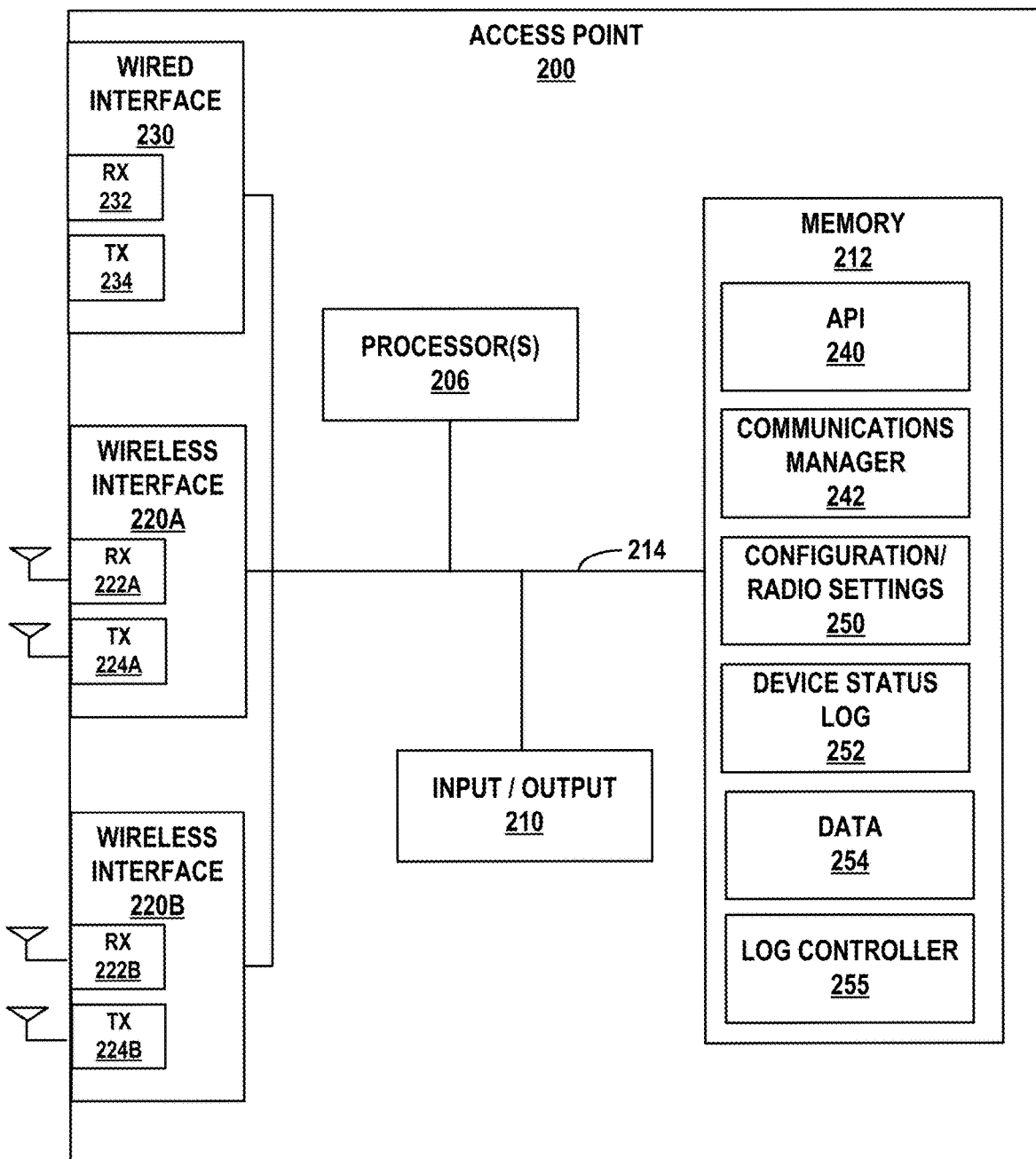
FIG. 2 is a block diagram of an example access point device in accordance with one or more techniques of the disclosure.

FIG. 2 is a block diagram of an example access point (AP) device 200, in accordance with one or more techniques of this disclosure. Example access point 200 shown in FIG. 2 may be used to implement any of APs 142 as shown and described herein with respect to FIG. 1A. Access point 200 may comprise, for example, a Wi-Fi, Bluetooth and/or Bluetooth Low Energy (BLE) base station or any other type of wireless access point.

In the example of FIG. 2, access point 200 includes a wired interface 230, wireless interfaces 220A-220B one or more processor(s) 206, memory 212, and input/output 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point 200 to a wired network device, such as one of switches 146 of FIG. 1A, within the wired network via a cable, such as an Ethernet cable.

First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1A. First and second wireless interfaces 220A and 220B further include transmitters 224A and 224B ("wireless transmitters 224"), respectively, each including transmit antennas via which access point 200 may transmit wireless signals to wireless communications devices, such as UEs 148 of FIG. 1A. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform the techniques described herein.

Memory 212 includes one or more devices configured to store programming modules and/or data associated with operation of access point 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform the techniques described herein.

In this example, memory 212 stores executable software including an application programming interface (API) 240, a communications manager 242, configuration settings 250, a device status log 252, data storage 254, and log controller 255. Device status log 252 includes network data, e.g., a list of network parameters and/or network events, specific to access point 200 and/or client devices currently or previously associated with access point 200. The network data may include, for example, any network parameter and/or network data indicative of one or more aspects of performance of the wireless network or of access point 200 itself. In some examples, the network data may include a plurality of states measured periodically as time series data. The network data may be measured by the UE devices 148 and transmitted to access point 200, may be measured by access point 200 itself or by any other device associated with the wireless network and transmitted to access point 200.

Network data stored in data 254 may include, for example, AP events and/or UE events. In some examples, the network events are classified as positive network events (otherwise referred to herein as "successful network events" or "successful events"), neutral network events, and/or negative network events (otherwise referred to herein as "failure network events" or "failure events"). The network events may include, for example, a log of both normal events and error events such as, for example, power status, Ethernet status, Ethernet port status, Ethernet interface packet errors, tunneling failure events, the time in which access point 200 is operational, etc., as well as a time and/or date stamp for each event. Log controller 255 determines a logging level for the device based on instructions from NMS 130. Data 254 may store any data used and/or generated by access point 200, including data collected from UEs 148, such as network data used to calculate one or more AP health SLE metrics, that is transmitted by access point 200 for cloud-based management of wireless networks 106A by NMS 130. For example, data 254 may store data associated with the power status of access point 200, data associated with Ethernet access provided via wired interface 230, data associated with network behavior (e.g., latency, jitter, tunnel connectivity), or data associated with the operational status of access point 200 (e.g., uptime).

Input/output (I/O) 210 represents physical hardware components that enable interaction with a user, such as buttons, a display, and the like. Although not shown, memory 212 typically stores executable software for controlling a user interface with respect to input received via I/O 210. Communications manager 242 includes program code that, when executed by processor(s) 206, allow access point 200 to communicate with UEs 148 and/or network(s) 134 via any of interface(s) 230 and/or 220A-220C. Configuration settings 250 include any device settings for access point 200 such as radio settings for each of wireless interface(s) 220A-220C. These settings may be configured manually or may be remotely monitored and managed by NMS 130 to optimize wireless network performance on a periodic (e.g., hourly or daily) basis.

As described herein, access point 200 may measure and report network data from status log 252 to NMS 130. The network data may comprise event data, telemetry data, and/or other SLE-related data. The network data may include various parameters indicative of the performance and/or status of the wireless network. The parameters may be measured and/or determined by one or more of the UE devices and/or by one or more of the APs in a wireless network. NMS 130 may determine one or more AP health SLE metrics based on the SLE-related data received from the APs in the wireless network and store the AP health SLE metrics as network data 137 (FIG. 1A).

Figure 3A:
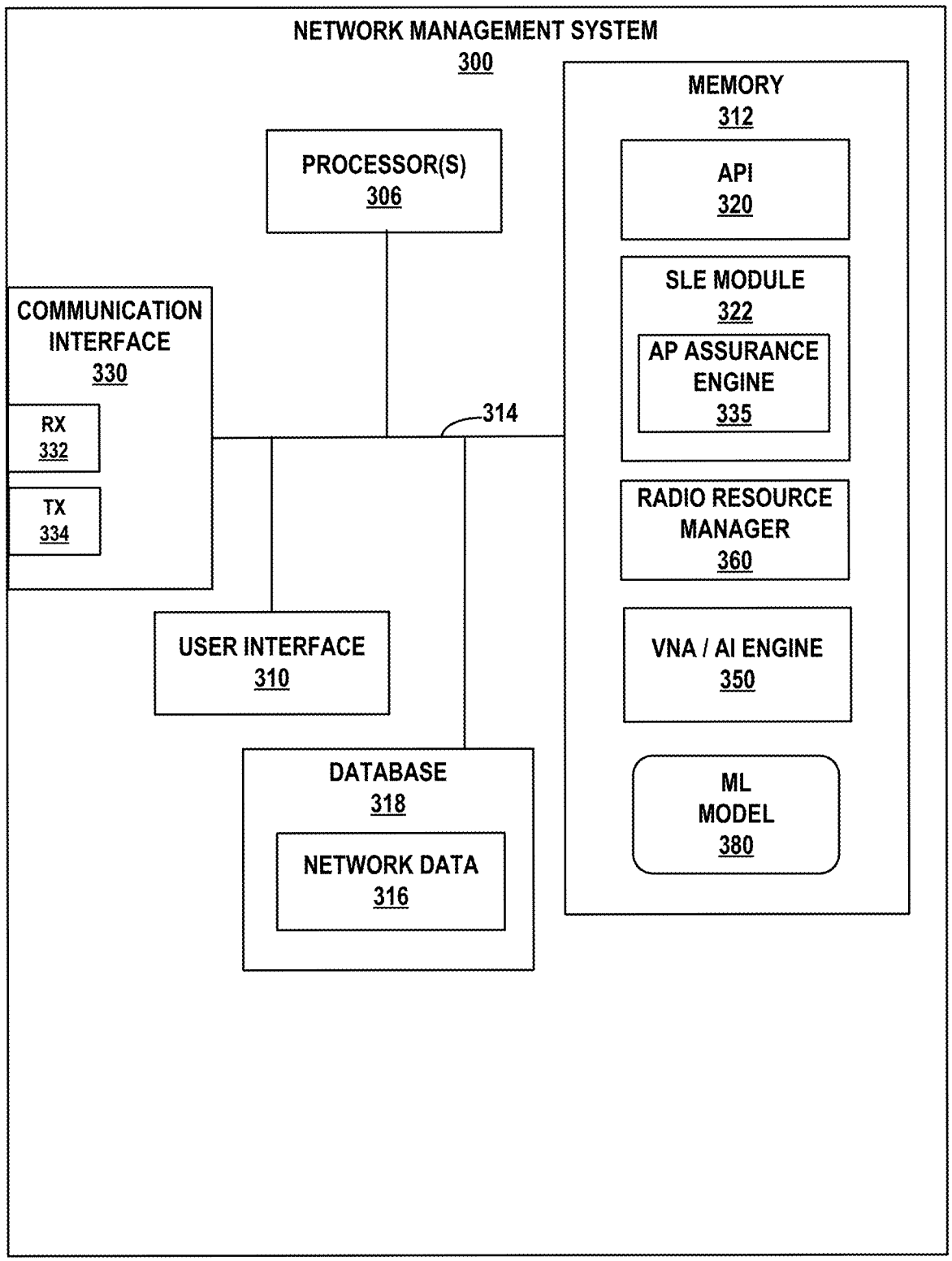
FIG. 3A is a block diagram of an example network management system configured to determine one or more health metrics for access points, in accordance with one or more techniques of the disclosure.

FIG. 3A is a block diagram of an example network management system (NMS) 300, in accordance with one or more techniques of the disclosure. NMS 300 may an example implementation of NMS 130 in FIGS. 1A-1B. In such examples, NMS 300 is responsible for monitoring and management of one or more wireless networks 106A-106N at sites 102A-102N, respectively.

NMS 300 includes a communications interface 330, one or more processor(s) 306, a user interface 310, a memory 312, and a database 318. The various elements are coupled together via a bus 314 over which the various elements may exchange data and information. In some examples, NMS 300 receives data from one or more of client devices 148, APs 142, switches 146 and/or other network nodes within network 134, e.g., routers 187 of FIG. 1B, which may be used to calculate one or more AP health SLE metrics and/or update network data 316 in database 318. NMS 300 analyzes this data for cloud-based management of wireless networks 106A-106N. In some examples, NMS 300 may be part of another server shown in FIG. 1A or a part of any other server.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of client devices 148, APs 142, switches 146, servers 110, 116, 122, 128 and/or any other network nodes, devices, or systems forming part of network system 100 such as shown in FIG. 1A. In some scenarios described herein in which network system 100 includes "third-party" network devices that are owned and/or associated with different entities than NMS 300, NMS 300 does not receive, collect, or otherwise have access to network data from the third-party network devices.

The data and information received by NMS 300 may include, for example, telemetry data, SLE-related data, or event data received from one or more of UEs 148, APs 142, switches 146, or other network nodes, e.g., switches 146 of FIG. 1A or routers 187 of FIG. 1B, used by NMS 300 to remotely monitor the performance of wireless networks 106A-106N and application sessions from client device to cloud-based application server. NMS 300 may further transmit data via communications interface 330 to any of network devices such as client devices 148, APs 142, switches 146, other network nodes within network 134, admin device 111 to remotely manage wireless networks 106A-106N and portions of the wired network.

Memory 312 includes one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, an SLE module 322, a virtual network assistant (VNA)/AI engine 350, and a radio resource management (RRM) engine 360. NMS 300 may also include any other programmed modules, software engines and/or interfaces configured for remote monitoring and management of wireless networks 106A-106N and portions of the wired network, including remote monitoring and management of any of APs 142/200, switches 146, or other network devices, e.g., routers 187 of FIG. 1B.

SLE module 322 enables set up and tracking of thresholds for AP health SLE metrics for each network 106A-106N. SLE module 322 further analyzes SLE-related data collected by APs, such as any of APs 142 (also referred to herein as "AP devices 142") from UEs in each wireless network 106A-106N. For example, APs 142A-1 through 142A-N collect SLE-related data from UEs 148A-1 through 148A-N currently connected to wireless network 106A. This data is transmitted to NMS 300, which executes SLE module 322 to determine one or more SLE metrics for each UE 148A-1 through 148A-N currently connected to wireless network 106A. This data, in addition to any network data collected by one or more APs 142A-1 through 142A-M in wireless network 106A, is transmitted to NMS 300 and stored as, for example, network data 316 in database 318. SLE module 322 may include AP assurance engine 335 to monitor, analyze, notify and/or remediate health issues associated with one or more AP health SLE metrics, as discussed in more detail in FIG. 3B.

RRM engine 360 monitors one or more metrics for each site 102A-102N in order to learn and optimize the RF environment at each site. For example, RRM engine 360 may monitor the coverage and capacity SLE metrics for a wireless network 106 at a site 102 in order to identify potential issues with SLE coverage and/or capacity in the wireless network 106 and to make adjustments to the radio settings of the access points at each site to address the identified issues. For example, RRM engine may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 102 with an aim to improve the coverage and capacity SLE metrics and thus to provide an improved wireless experience for the user.

VNA/AI engine 350 analyzes data received from network devices as well as its own data to identify when undesired to abnormal states are encountered at one of the network devices. For example, VNA/AI engine 350 may identify the root cause of any undesired or abnormal states, e.g., any poor SLE metric(s) indicative of connected issues at one or more network devices. In addition, VNA/AI engine 350 may automatically invoke one or more corrective actions intended to address the identified root cause(s) of one or more poor SLE metrics. Examples of corrective actions that may be automatically invoked by VNA/AI engine 350 may include, but are not limited to, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoking downloading of new software to an AP, switch, or router, etc. These corrective actions are given for example purposes only, and the disclosure is not limited in this respect. If automatic corrective actions are not available, VNA/AI engine 350 may provide a notification of the issue, and in some instances, including recommended corrective actions to be taken by IT personnel, e.g., a site or network administrator, to address the network error. VNA/AI engine 350 may perform the actions of AP assurance engine 335 as discussed in more detail herein.

In some examples, ML model 380 may comprise a supervised ML model that is trained, using training data comprising pre-collected, labeled network data received from network devices (e.g., client devices, APs, switches and/or other network nodes), to identify AP health SLE metrics. The supervised ML model may comprise one of a logistical regression, naïve Bayesian, support vector machine (SVM), or the like. In other examples, ML model 380 may comprise an unsupervised ML model. Although not shown in FIG. 3A, in some examples, database 318 may store the training data and VNA/AI engine 350 or a dedicated training module may be configured to train ML model 380 based on the training data to determine appropriate weights across the one or more features of the training data.

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 3B:
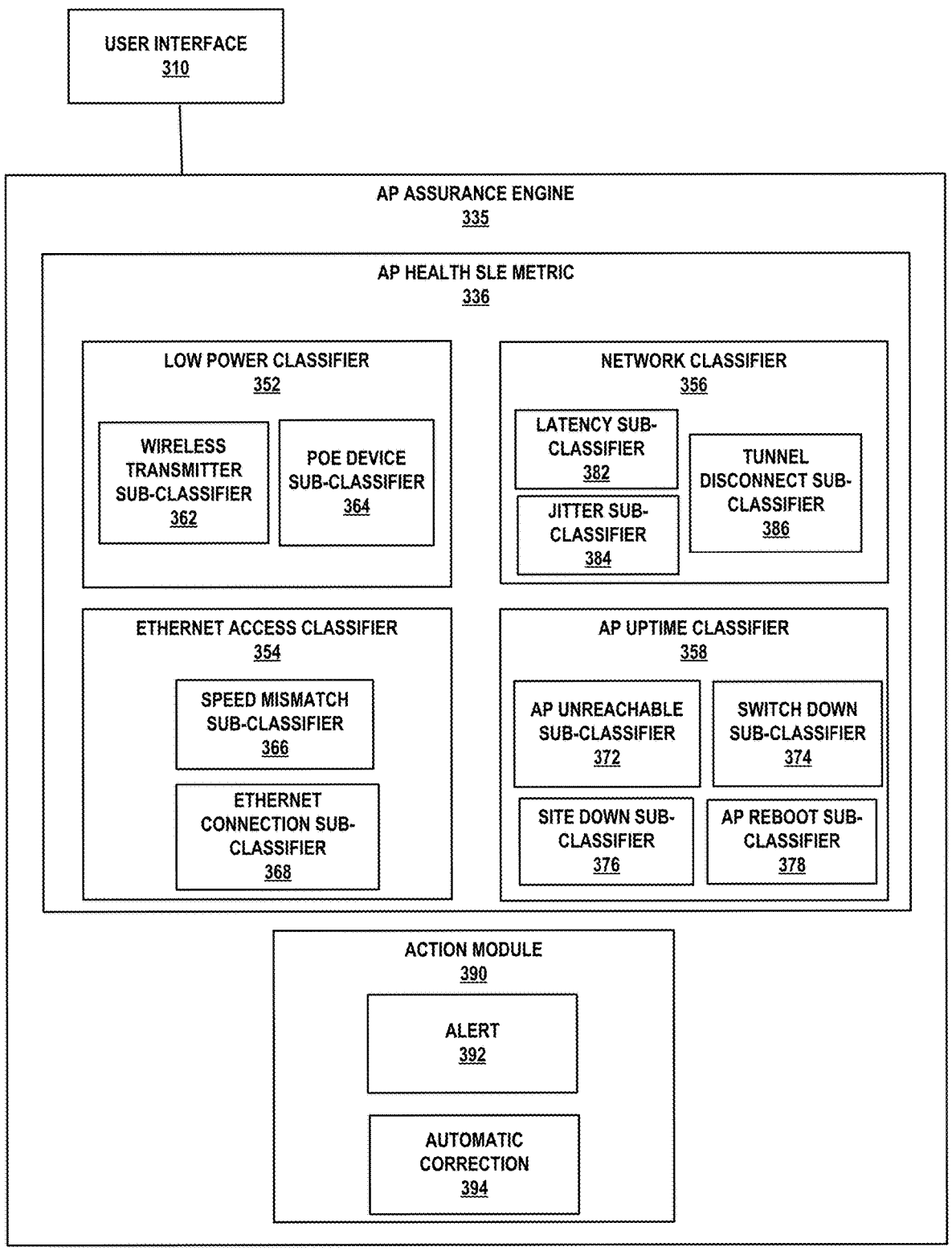
FIG. 3B is a block diagram illustrating further example details of an AP assurance engine of the network management system from FIG. 3A.

FIG. 3B is a block diagram illustrating further example details of an AP assurance engine of the network management system from FIG. 3A. Example AP assurance engine 335 may be configured to perform one or more assessments to network data to detect any health issues of one or more APs of a network site. For example, AP assurance engine 335 may include an analytics engine (not shown) configured to determine, based on network data 316, whether network data satisfies one or more configurable criteria (e.g., threshold) associated with one or more classifiers or sub-classifiers of a service level expectation metric (referred to herein as "AP health SLE metric 336"), and if the network data does not satisfy the criteria (e.g., network data is below performance expectations), AP assurance engine 335 may attribute the health issue identified by the one or more classifiers or sub-classifiers of AP health SLE metric 336 as the health issue of the AP, e.g., by assigning one or more classifiers or sub-classifiers of AP health SLE 336 as the health issue of an AP device. AP assurance engine 335 may attribute a health issue to a classifier or sub-classifier, which in turn may be used to perform a particular remedy action associated with the classifier or sub-classifier indicative of the detected health issue, as discussed in more detail herein.

AP health SLE metric 336 may include classifiers, such as low power classifier 352, Ethernet access classifier 354, network classifier 356, and/or an AP uptime classifier 358. For example, low power classifier 352 may classify health issues in which the current power usage of an AP device is too low or insufficient such that user experience may be affected. Low power classifier 352 may include a wireless transmitter sub-classifier 362 that is used to classify a health issue of the AP device where the current power usage of AP device is too low or insufficient to power a wireless transmitter of the AP device. Wireless transmitter sub-classifier 362 may include criteria (e.g., threshold value specifying a minimum or sufficient power requirement for operation of a wireless transmitter) that represents one or more parameters needed to power a wireless transmitter of the AP device. AP assurance engine 335 may define the criteria included in wireless transmitter sub-classifier 362 based on model-specific parameters associated with sufficient power requirements of wireless transmitters of the AP device. AP assurance engine 335 may obtain network data, e.g., current power usage data, of an AP device and compare the current power usage data to the criteria. If, for example, AP assurance engine 335 determines the current power usage data of the AP device does not satisfy the threshold value specifying a minimum power to power the wireless transmitter of the AP device (e.g., the criteria of wireless transmitter sub-classifier 362), AP assurance engine 352 may attribute the health issue of the AP device to wireless transmitter sub-classifier 362 (e.g., assign wireless transmitter sub-classifier 362 to the AP device). The threshold value specifying a minimum power is merely one example of a criteria for the wireless transmitter sub-classifier 263. The criteria may include any type of criteria to determine whether there is sufficient power requirements of wireless transmitters such that if AP assurance engine 335 determines the current power usage data of the AP device does satisfy a criteria to determine insufficient power for the wireless transmitter of the AP device (e.g., the criteria of wireless transmitter sub-classifier 362), AP assurance engine 352 may attribute the health issue of the AP device to wireless transmitter sub-classifier 362 (e.g., assign wireless transmitter sub-classifier 362 to the AP device).

Low power classifier 352 may additionally, or alternatively, include a Power over Ethernet (PoE) device sub-classifier 364 that is used to classify a health issue of the AP device where the current power usage of the AP device is too low or insufficient to supply power to Power over Ethernet (PoE) devices connected to the AP device. PoE device sub-classifier 364 may include criteria (e.g., threshold value specifying a minimum or sufficient power value required for operation of one or more PoE devices) that represents one or more parameters needed to supply power to the PoE devices connected to the AP device. AP assurance engine 335 may define the criteria included in PoE device sub-classifier 364 based on model-specific parameters associated with sufficient power requirements of PoE devices connected to the AP device. AP assurance engine 335 may obtain network data, e.g., current power usage data, of the AP device and compare the current power usage data to the criteria. If, for example, AP assurance engine 335 determines the current power usage data of the AP device does not satisfy the threshold value specifying a minimum power needed to supply power to the PoE devices connected to the AP device (e.g., criteria corresponding to PoE device sub-classifier 364), AP assurance engine 335 may attribute the health issue of the AP device to PoE device sub-classifier 364 (e.g., assign PoE device sub-classifier 364 to the AP device). The threshold value specifying a minimum power is merely one example of a criteria for the PoE device sub-classifier 364. The criteria may include any type of criteria to determine whether there is sufficient power requirements of PoE devices connected to the AP device such that if AP assurance engine 335 determines the current power usage data of the AP device does satisfy a criteria to determine insufficient power associated with the PoE devices connected to the AP device (e.g., the criteria of PoE device sub-classifier 364), AP assurance engine 352 may attribute the health issue of the AP device to PoE device sub-classifier 364 (e.g., assign PoE devices sub-classifier 362 to the AP device). In some examples, low power classifier 352 may include additional sub-classifiers to classify other power-related issues that can be attributed as health issues of an AP device.

Ethernet access classifier 354 may classify health issues in which an AP device is unable to access the network with an Ethernet connection via connected network devices (e.g., switches). For example, Ethernet access classifier 354 may classify Ethernet issues occurring in the physical layer (e.g., layer 1 of OSI model) or the data link layer (e.g., layer 2 of OSI model). Ethernet access classifier 354 may include a speed mismatch sub-classifier 366 that is used to classify a health issue of the AP device where the AP device is not providing a speed correlating to the AP device's capabilities. Speed mismatch sub-classifier 366 may include criteria (e.g., threshold value of expected speed) that represents one or more parameters to enable an AP device to access the network with an Ethernet connection. AP assurance engine 335 may obtain network data, e.g., expected speed data of an AP device or other NAS devices and compare the expected speed data to the criteria. For example, AP assurance engine 335 may obtain data used to determine whether a switch connected to the AP device is capable of operating at the speed negotiated with the AP device (e.g., 1 gbps). For instance, AP assurance engine 335 may obtain the name of a switch to determine whether the switch is capable of operating at 1 gbps. In other instances, AP assurance engine 335 may obtain data associated with other AP devices connected to the switch to determine whether the other AP devices are also operating at the negotiated speed of 1 gbps or whether the AP device is the only AP device with the speed mismatch issue. If, for example, AP assurance engine 335 determines that the switch connected to the AP device is capable of operating at the negotiated speed and the current connection speed of an AP device does not satisfy the expected speed (e.g., criteria corresponding to speed mismatch sub-classifier 366), AP assurance engine 335 may attribute the health issue of the AP device to speed mismatch sub-classifier 366 (e.g., assign the speed mismatch sub-classifier 366 to the AP device), which may indicate an issue with the Ethernet cable connecting the AP to the switch. The threshold value specifying the expected speed is merely one example of a criteria for the speed mismatch sub-classifier 366. The criteria may include any type of criteria to determine whether there is a speed mismatch such that if AP assurance engine 335 determines the current connection speed of an AP device does satisfy criteria to determine insufficient speed (e.g., criteria corresponding to speed mismatch sub-classifier 366), AP assurance engine AP assurance engine 335 may attribute the health issue of the AP device to speed mismatch sub-classifier 366 (e.g., assign the speed mismatch sub-classifier 366 to the AP device).

Ethernet access classifier 354 may additionally, or alternatively, include an Ethernet connection sub-classifier 368 that is used to classify a health issue of the AP device resulting from Ethernet errors. Ethernet connection sub-classifier 368 may include criteria (e.g., threshold value of maximum frame size, maximum packet length, or validation protocol) that represents one or more parameters to enable an AP device to access the network with an Ethernet connection. For example, Ethernet connection sub-classifier 368 may include criteria corresponding to a value defining an Ethernet frame with a maximum packet length. AP assurance engine 335 may obtain network data, e.g., packet length, of the AP device and compare the packet length to the criteria. AP assurance engine 335 may determine that the packet length does not satisfy the criteria of Ethernet connection sub-classifier 368 (e.g., packet length exceeds the maximum packet length), which represents an oversized packet error has occurred possibly due to misconfiguration. In response to determining that the packet length does not satisfy the maximum packet length (e.g., criteria of Ethernet connection sub-classifier 368), AP assurance engine 335 may attribute the health issue of the AP device to Ethernet connection sub-classifier 368 (e.g., assign Ethernet connection sub-classifier 368 to the AP device). In some examples, AP assurance engine 335 may obtain data from each AP device connected to a switch to determine whether the Ethernet issue is attributed to the AP devices or the switch. In these examples, AP assurance engine 335 may obtain the packet length from each of the AP devices connected to the switch and compare the packet length to the criteria. If, for example, AP assurance engine 335 determines that the packet length for each of the AP devices connected to the switch does not satisfy the maximum packet length (e.g., criteria of the Ethernet connection sub-classifier 368), AP assurance engine 335 may attribute the health issue of the AP device and/or the switch connected to the AP device to Ethernet connection sub-classifier 368 (e.g., assign the Ethernet connection sub-classifier 368 to the AP device). The threshold value specifying a maximum packet length is merely one example of a criteria for the Ethernet connection sub-classifier 368. The criteria may include any type of criteria to determine whether there is an Ethernet issue such that if AP assurance engine 335 determine that the packet length for each AP device does satisfy criteria to determine insufficient Ethernet connection, AP assurance engine 335 may attribute the health issue of the AP device and/or the switch connected to the AP device to Ethernet connection sub-classifier 368 (e.g., assign the Ethernet connection sub-classifier 368 to the AP device). In some examples, Ethernet access classifier 354 may include additional sub-classifiers to classify other physical layer connection issues that can be attributed as health issues of an AP device.

Network classifier 356 may classify health issues in which a network an AP device is connected to is performing poorly or is unavailable. For example, network classifier 356 may classify network issues occurring in the various layers of network system 100. Network classifier 356 may include a latency sub-classifier 382 that is used to classify a health issue of the AP device where there is a delay in the amount of time the AP device takes to receive and/or transmit a packet of data. Latency sub-classifier 382 may include criteria (e.g., threshold ping rate value, range of allowable ping rate values, etc.) that represents one or more parameters associated with an allowable latency performance of the AP device. For example, latency sub-classifier 382 may include criteria corresponding to a value defining an acceptable ping rate or latency measurement of an AP device. AP assurance engine 335 may obtain network data, e.g., ping rate, of the AP device and compare the ping rate to the criteria. AP assurance engine 335 may determine whether the ping rate satisfies or does not satisfy the criteria of latency sub-classifier 382 (e.g., obtained ping rate exceeds a maximum acceptable ping rate). For example, in response to determining that the ping rate does not satisfy the maximum acceptable ping rate (e.g., criteria of latency sub-classifier 382), AP assurance engine 335 may attribute the health issue of the AP device to latency sub-classifier 382 (e.g., assign the latency sub-classifier 382 to the AP device). The threshold value specifying a maximum acceptable ping rate is merely one example of a criteria for the latency sub-classifier 382. The criteria may include any type of criteria to determine whether there is sufficient latency requirements such that if AP assurance engine 335 determines that the ping rate or latency does satisfy criteria to determine insufficient ping rate, AP assurance engine 335 may attribute the health issue of the AP device to latency sub-classifier 382.

Network classifier 356 may additionally, or alternatively, include a jitter sub-classifier 384 that is used to classify a health issue of the AP device where there is a time delay between when a signal is transmitted by a device of network system 100 and when the signal is received by a device of network system 100. Jitter sub-classifier 384 may include criteria (e.g., threshold jitter score, range of allowable variability in latency values, etc.) that represents one or more parameters associated with a level of tolerance for jitter resulting from the performance of an AP device. For example, jitter sub-classifier 384 may include criteria corresponding to a value defining an acceptable variability in ping, jitter score, or type of jitter (e.g., constant jitter, transient jitter, short term delay variation, etc.) caused by an AP device. AP assurance engine 335 may obtain network data, e.g., jitter score, of the AP device and compare the jitter score to the criteria. AP assurance engine 335 may determine whether the jitter score satisfies or does not satisfy the criteria of jitter sub-classifier 384 (e.g., obtained jitter score exceeds a maximum acceptable jitter score). For example, in response to determining that the jitter score does not satisfy the maximum acceptable jitter score or does satisfy criteria specifying an insufficient jitter score (e.g., criteria of jitter sub-classifier 384), AP assurance engine 335 may, for example, attribute the health issue of the AP device to jitter sub-classifier 384 (e.g., assign the jitter sub-classifier 384 to the AP device). The threshold value specifying a threshold jitter score is merely one example of a criteria for the jitter sub-classifier 384. The criteria may include any type of criteria to determine whether there is sufficient jitter requirements such that if AP assurance engine 335 determines that the jitter score does satisfy criteria to determine insufficient jitter, AP assurance engine 335 may attribute the health issue of the AP device to jitter sub-classifier 384.

Network classifier 356 may additionally, or alternatively, include a tunnel disconnect sub-classifier 386 that is used to classify a health issue of the AP device in which a tunnel used by the AP device is down. For example, an AP device may establish a tunnel to an edge device (e.g., edge device 150 of FIG. 1A) of a site. The tunnel may include a Layer 2 Tunnel Protocol Version 3 (L2TPv3) tunnel, a Multiprotocol Label Switching (MPLS) tunnel, or any other type of tunnel. Tunnel disconnect sub-classifier 386 may include criteria (e.g., tunnel configuration parameters, such as tunnel endpoints or other tunnel attributes) representing one or more parameters needed for an operational tunnel. AP assurance engine 335 may obtain network data, e.g., tunnel status (e.g., whether tunnel is up, down, or changed) and/or tunnel configuration parameters, and compares the tunnel configuration parameters with the criteria. If AP assurance engine 335 determines the data associated with current tunnel configuration satisfies or does not satisfy the criteria corresponding to tunnel disconnect sub-classifier 386 (e.g., tunnel configuration parameters between tunnel endpoints are mismatched), AP assurance engine 335 may attribute the health issue of the AP device to tunnel disconnect sub-classifier 386 (e.g., assign the tunnel disconnect sub-classifier 386 to the AP device). In some examples, network classifier 356 may include additional sub-classifiers to classify other network issues that can be attributed as health issues of an AP device.

AP uptime classifier 358 may classify health issues in which an AP is disconnected from the network. AP uptime classifier 358 may include one or more sub-classifiers, such as AP unreachable sub-classifier 372, switch down sub-classifier 374, site down sub-classifier 376, and AP reboot sub-classifier 378 (collectively "AP uptime sub-classifiers"). AP uptime sub-classifier may include criteria (e.g., threshold value of a number of AP reboots) that represents one or more parameters of an operational AP device of a site. AP assurance engine 335 may obtain network data, e.g., number of AP reboots, and compares the network data to the criteria. If AP assurance engine 335 determines the data associated with an AP uptime satisfies or does not satisfy the criteria corresponding to an AP uptime sub-classifier (e.g., number of AP reboots exceeds a minimum number of AP reboots), AP assurance engine 335 may attribute the health issue of the AP device to the one or more AP uptime sub-classifiers (e.g., assign the AP uptime sub-classifier 378 to the AP device). Additional example details of AP uptime classifier 358 and its corresponding sub-classifiers are described in U.S. application Ser. No. 17/454,702, filed Nov. 12, 2021, and entitled "Location Metrics for Monitoring or Control of Wireless Networks," which is incorporated herein by reference in its entirety.

In response to AP assurance engine 335 attributing the health issue of the AP device to a classifier or sub-classifier, AP assurance engine 335 may take a corrective action corresponding to the classifier or sub-classifier via action module 390. In some examples, one or more actions are associated with a corresponding classifier or sub-classifier. In an example, in response to attributing the health issue of the AP device to a wireless transmitter sub-classifier 362, action module 390 may automatically perform a corrective action to remediate the lack of power being sent to the wireless transmitter by reconfiguring or rebooting the AP device via automatic correction 394. Additionally, or alternatively, action module 390 may also perform an action to send, via alert 392, a notification of the issue (e.g., a user interface element indicating the issue) to an administrator of the site. In some examples, the notification may additionally, or alternatively, include a recommended corrective action to be taken by an administrator of the site, e.g., replace the AP device to address the lack of power being sent to the wireless transmitter, replace the power cable, etc. In another example, in response to attributing the health issue of the AP device to a PoE device sub-classifier 364, action module 390 may automatically perform a corrective action, such as reconfiguring the AP device powering the PoE device with insufficient power via automatic correction 394 or send a notification, via alert 392, to an administrator of the site specifying the issue, and in some instances, a recommendation of how to address the lack of power provided to PoE devices.

In another example, in response to attributing the health issue of an AP device to a speed mismatch sub-classifier 366, AP assurance engine 335 may perform, via alert 392, an action to send a notification to an administrator of the site specifying the wired connection from the AP device to the switch may be at fault and/or recommend the administrator replace the hardwire connection. In another example, in response to attributing the health issue of an AP device to an Ethernet connection sub-classifier 368, action module 390 may automatically perform, via automatic correction 394, a corrective action to reconfigure the AP device to correct the Ethernet connection issue. Action module 390 may additionally, or alternatively, perform an action, via alert 392, to send a notification to an administrator of the site specifying the Ethernet cable connecting the AP device to the switch is at fault and/or recommend the administrator to replace the cable.

In general, action module 390 may take a corrective action in response to AP assurance engine 335 attributing a health issue of the AP device to a classifier or sub-classifier associated with the AP health SLE metrics. Action module 390 may include automatic correction 394 representing an automated action taken or invoked by the NMS (e.g., reconfigure an AP device in response to attributing the health issue of the AP device to a classifier or sub-classifier of the AP health SLE). In some instances, action module 390 may not be able to remedy the health issue associated with a classifier or sub-classifier via automatic correction 394 (e.g., third-party devices that are managed by the NMS). In these instances, action module 390 may use alert 392 to proactively provide an alert or notification of the health issue, such as displaying on a display device user interface 310 that includes a user interface element representing the alert or notification, and in some examples, including recommended corrective actions to be taken by a network administrator to address the network error associated with a classifier or sub-classifier (e.g., change physical components, such as cables and/or devices). The automatic corrective action and/or alert including recommended corrective actions may be referred to as a "remedy action."

In some examples, AP assurance engine 335 may attribute the health issue of an AP device to a plurality of classifiers or sub-classifiers. In such examples, action module 390 may prioritize any automatic correction 394 or alert 392 with respect to a static list ordering each classifier or sub-classifier in terms of perceived impact on a user's experience. For example, AP assurance engine 335 may attribute the health issue of an AP device to both wireless transmitter sub-classifier 362 and Ethernet connection sub-classifier 368. In this example, the static list may prioritize wireless transmitter sub-classifier 362 over Ethernet connection sub-classifier 368, and action module 390 may perform a remedy action to address wireless transmitter sub-classifier 362 prior to performing a remedy action to address Ethernet connection sub-classifier 368.

While the corrective actions are described above as performed by action module 390 of AP assurance engine 335, the corrective actions described herein may be performed by VNA/AI engine 350 of FIG. 3A. For example, VNA/AI engine 350 may identify a root cause of an AP device health issue based on a classifier or sub-classifier assigned to the health issue. In some instances, VNA/AI engine 350 may track or monitor the frequency a classifier or sub-classifier was assigned to one or more AP devices of a site. VNA/AI engine 350 may use the frequency a particular classifier or sub-classifier was assigned to AP devices of a site to intelligently determine which classifier or sub-classifier accurately reflects the root cause of an AP device health issue. In some examples, VNA/AI engine 350 may perform a corrective action based on the frequency a classifier or sub-classifier was assigned to AP devices of the site or, alternatively, VNA/AI engine 250 may deprioritize a corrective action based on the frequency a classifier or sub-classifier was assigned to AP devices of the site. VNA/AI engine 350 may additionally be configured to intelligently send notifications to an administrator of the AP device with a health issue that may include one or more recommendations to solve the health issue of the AP device. VNA/AI engine 350 may determine the root cause of the AP device health issue based on an attributed classifier or sub-classifier and output one or more recommendations of corrective actions corresponding to an attributed classifier or sub-classifier. In some examples, VNA/AI engine 350 may intelligently determine whether the root cause of the health issue originates from the site that include the AP device with the health issue or from another device of network system 100. VNA/AI engine 350 may send a notification of the root cause and/or recommendations of corrective action to an appropriate administrator based on determining where the health issue originated from. In this way, VNA/AI engine 350 may reduce the number of notifications sent to an administrator based on a particular health issue by intelligently sending notifications or recommendations in turn until attempts to resolve the health issue have been performed.

In some instances, an administrator may configure the criteria for each classifier and/or sub-classifier via user interface 310. For example, user interface 310 may allow the administrator to specify the minimum power requirements of an AP device to power connected wireless transmitters as the criteria for a wireless transmitter sub-classifier. In another example, user interface 310 may allow the administrator to specify an expected Ethernet connection speed between an AP device and a switch as the criteria for the speed-mismatch sub-classifier.

User interface 310 may also display the SLE health metrics to an administrator through graphs and/or charts. User interface 310 may display the network data obtained by AP assurance engine 335 as a function of time. In some examples, user interface 310 may display an aggregate of the network data that was obtained by AP assurance engine 335 in intervals and divided into one or more buckets. The one or more buckets may correspond to a certain time of a day of the week. User interface 310 may display whether the health issue of the AP device was attributed to a classifier or sub-classifier within a given bucket to indicate how often the issue has occurred and/or the duration of the issue.

In some instances, user interface 310 may display the network data and flag time periods where AP assurance engine 335 has attributed the health issue of an AP device to a classifier or sub-classifier. The one or more buckets may contribute to whether a classifier attributed to a health issue of an AP device is a significant health issue that needs an immediate remedy action or whether the classifier attributed to an AP device is due to environmental factors associated with a certain time on certain days of the week. User interface 310 may also apply the one or more buckets to provide statistical insights into the frequency AP assurance engine 335 attributes a health issue of the AP device to a classifier or sub-classifier.

Figure 4:
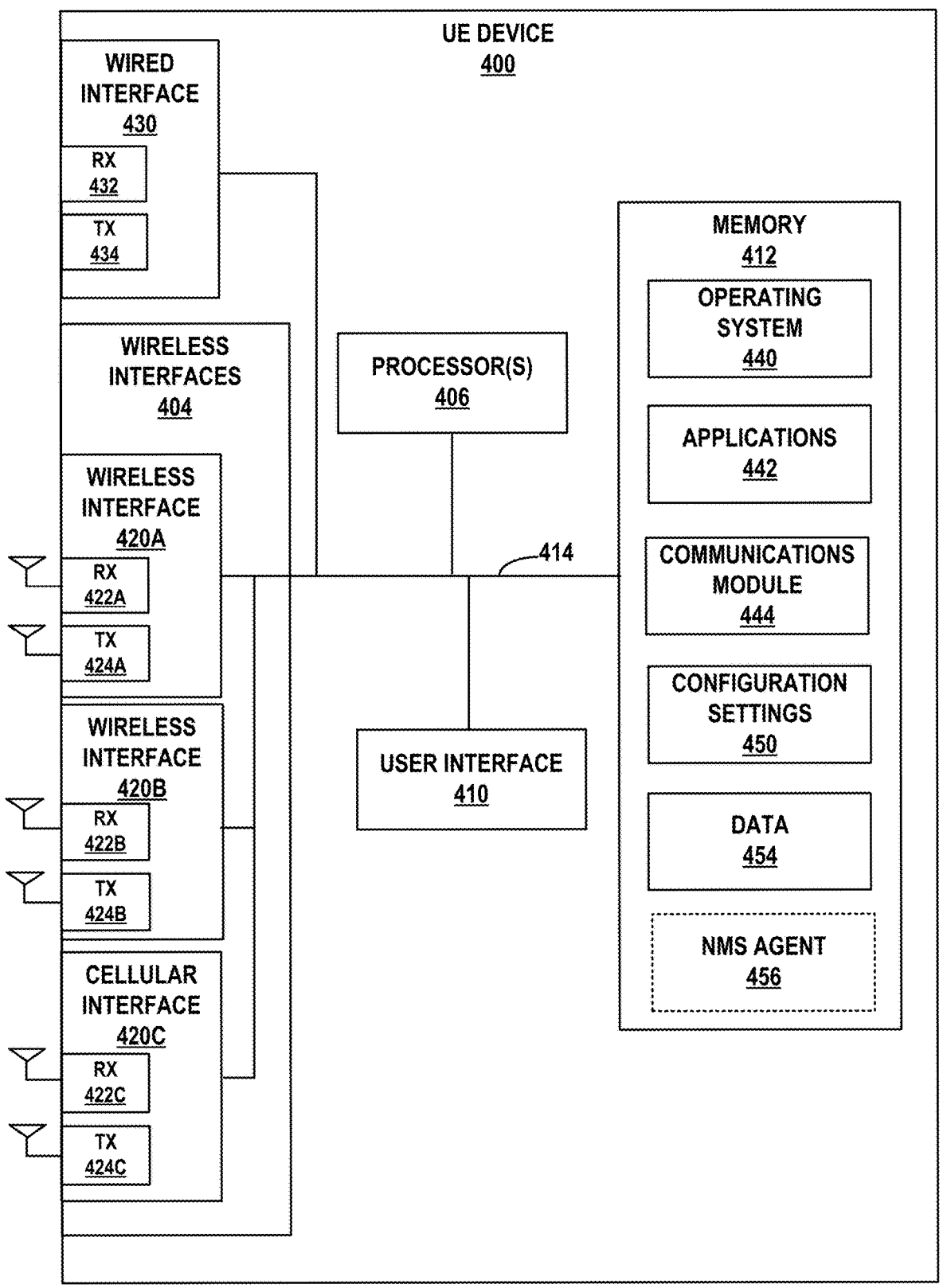
FIG. 4 is a block diagram of an example access point device, in accordance with one or more techniques of this disclosure.

FIG. 4 shows an example user equipment (UE) device 400, in accordance with one or more techniques of this disclosure. Example UE device 400 shown in FIG. 4 may be used to implement any of UEs 148 as shown and described herein with respect to FIG. 1A. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring, or any other type of mobile or wearable device. In some examples, UE 400 may also include a wired client-side device, e.g., an IoT device such as a printer, a security sensor or device, an environmental sensor, or any other device connected to the wired network and configured to communicate over one or more wireless networks.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 represents a physical network interface and includes a receiver 432 and a transmitter 434. Wired interface 430 may be used, if desired, to couple, either directly or indirectly, UE 400 to a wired network device, such as one of switches 146 of FIG. 1A, within the wired network via a cable, such as one of Ethernet cables 144 of FIG. 1A.

First, second and third wireless interfaces 420A, 420B, and 420C include receivers 422A, 422B, and 422C, respectively, each including a receive antenna via which UE 400 may receive wireless signals from wireless communications devices, such as APs 142 of FIG. 1A, AP 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as APs 142 of FIG. 1A, AP 200 of FIG. 2, other UEs 148 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage 454. Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for each of wireless interface(s) 420A-420B and/or cellular interface 420C.

Data storage 454 may include, for example, a status/error log including a list of events specific to UE 400. The events may include a log of both normal events and error events according to a logging level based on instructions from NMS 130. Data storage 454 may store any data used and/or generated by UE 400, such as data used to calculate one or more SLE metrics or identify relevant behavior data, that is collected by UE 400 and either transmitted directly to NMS 130 or transmitted to any of APs 142 in a wireless network 106 for further transmission to NMS 130.

As described herein, UE 400 may measure and report network data from data storage 454 to NMS 130. The network data may comprise event data, telemetry data, and/or other SLE-related data. The network data may include various parameters indicative of the performance and/or status of the wireless network. NMS 130 may determine one or more SLE metrics and store the SLE metrics as network data 137 (FIG. 1A) based on the SLE-related data received from the UEs or client devices in the wireless network.

Optionally, UE device 400 may include an NMS agent 456. NMS agent 456 is a software agent of NMS 130 that is installed on UE 400. In some examples, NMS agent 456 can be implemented as a software application running on UE 400. NMS agent 456 collects information including detailed client-device properties from UE 400, including insight into UE 400 roaming behaviors. The information provides insight into client roaming algorithms, because roaming is a client device decision. In some examples, NMS agent 456 may display the client-device properties on UE 400. NMS agent 456 sends the client device properties to NMS 130, via an AP device to which UE 400 is connected. NMS agent 456 can be integrated into a custom application or as part of location application. NMS agent 456 may be configured to recognize device connection types (e.g., cellular or Wi-Fi), along with the corresponding signal strength. For example, NMS agent 456 recognizes access point connections and their corresponding signal strengths. NMS agent 456 can store information specifying the APs recognized by UE 400 as well as their corresponding signal strengths. NMS agent 456 or other element of UE 400 also collects information about which APs the UE 400 connected with, which also indicates which APs the UE 400 did not connect with. NMS agent 456 of UE 400 sends this information to NMS 130 via its connected AP. In this manner, UE 400 sends information about not only the AP that UE 400 connected with, but also information about other APs that UE 400 recognized and did not connect with, and their signal strengths. The AP in turn forwards this information to the NMS, including the information about other APs the UE 400 recognized besides itself. This additional level of granularity enables NMS 130, and ultimately network administrators, to better determine the Wi-Fi experience directly from the client device's perspective.

In some examples, NMS agent 456 further enriches the client device data leveraged in service levels. For example, NMS agent 456 may go beyond basic fingerprinting to provide supplemental details into properties such as device type, manufacturer, and different versions of operating systems. In the detailed client properties, the NMS 130 can display the Radio Hardware and Firmware information of UE 400 received from NMS client agent 456. The more details the NMS agent 456 can draw out, the better the VNA/AI engine gets at advanced device classification. The VNA/AI engine of the NMS 130 continually learns and becomes more accurate in its ability to distinguish between device-specific issues or broad device issues, such as specifically identifying that a particular OS version is affecting certain clients.

In some examples, NMS agent 456 may cause user interface 410 to display a prompt that prompts an end user of UE 400 to enable location permissions before NMS agent 456 is able to report the device's location, client information, and network connection data to the NMS. NMS agent 456 will then start reporting connection data to the NMS along with location data. In this manner, the end user of the client device can control whether the NMS agent 456 is enabled to report client device information to the NMS.

Figure 5:
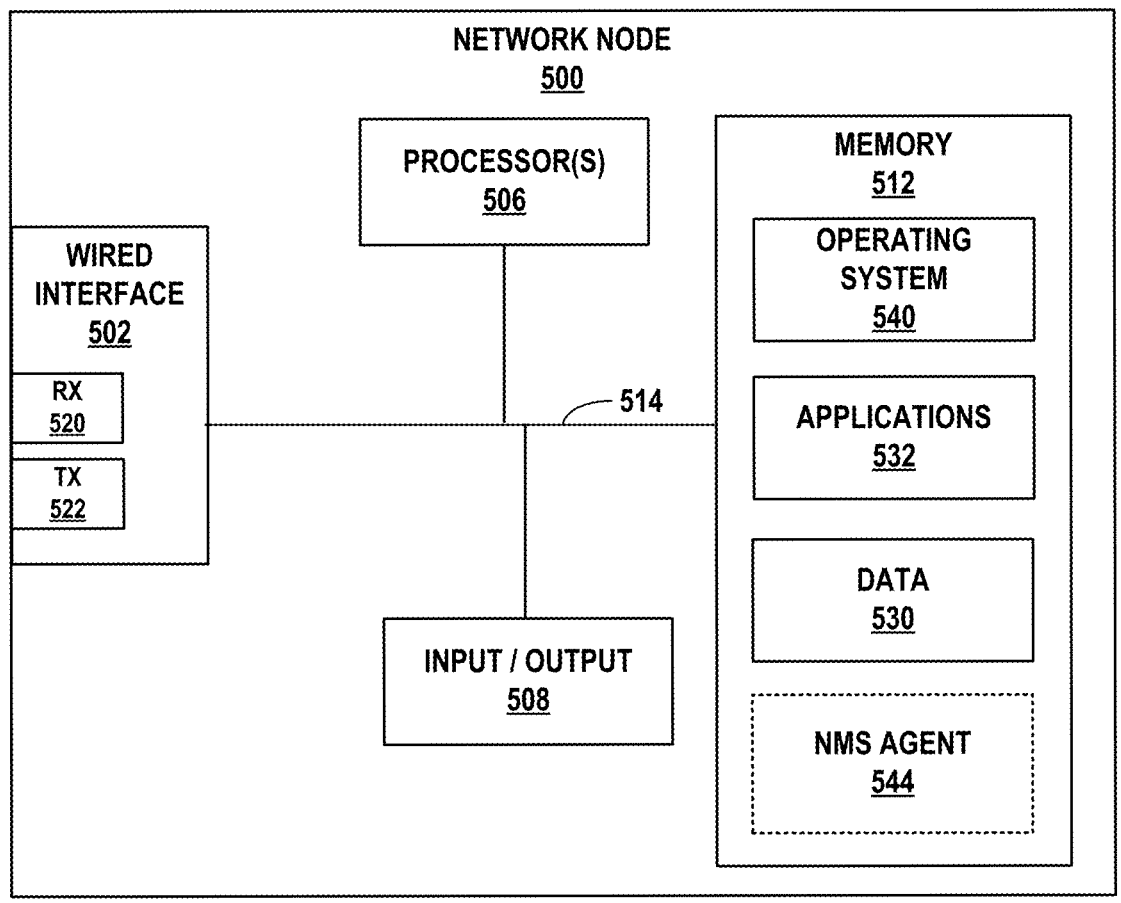
FIG. 5 is a block diagram of an example network node, in accordance with one or more techniques of this disclosure.

FIG. 5 is a block diagram illustrating an example network node 500, in accordance with one or more techniques of this disclosure. In one or more examples, the network node 500 implements a device or a server attached to the network 134 of FIG. 1A, e.g., switches 146, AAA server 110, DHCP server 116, DNS server 122, web servers 128, etc., or another network device supporting one or more of wireless network 106, wired LAN 175, or SD-WAN 177, or data center 179 of FIG. 1B, e.g., routers 187.

In this example, network node 500 includes a wired interface 502, e.g., an Ethernet interface, a processor 506, input/output 508, e.g., display, buttons, keyboard, keypad, touch screen, mouse, etc., and a memory 512 coupled together via a bus 514 over which the various elements may interchange data and information. Wired interface 502 couples the network node 500 to a network, such as an enterprise network. Though only one interface is shown by way of example, network nodes may, and usually do, have multiple communication interfaces and/or multiple communication interface ports. Wired interface 502 includes a receiver 520 and a transmitter 522.

Memory 512 stores executable software applications 532, operating system 540 and data/information 530. Data 530 may include a system log and/or an error log that stores event data, including behavior data, for network node 500. For example, data 530 may include data associated with Ethernet access provided via wired interface 230 (e.g., network node name to determine whether the network node supports certain Ethernet speeds), data associated with tunnels connected to network node 500, or data associated with the time network node 500 is connected to an AP. In examples where network node 500 comprises a "third-party" network device, the same entity does not own or have access to both the APs or wired client-side devices and network node 500. As such, in the example where network node 500 is a third-party network device, NMS 130 does not receive, collect, or otherwise have access to the network data from network node 500.

In examples where network node 500 comprises a server, network node 500 may receive data and information, e.g., including operation related information, e.g., registration request, AAA services, DHCP requests, Simple Notification Service (SNS) look-ups, and Web page requests via receiver 520, and send data and information, e.g., including configuration information, authentication information, web page data, etc. via transmitter 522.

In examples where network node 500 comprises a wired network device, network node 500 may be connected via wired interface 502 to one or more APs or other wired client-side devices, e.g., IoT devices. For example, network node 500 may include multiple wired interfaces 502 and/or wired interface 502 may include multiple physical ports to connect to multiple APs or the other wired-client-side devices within a site via respective Ethernet cables. In some examples, each of the APs or other wired client-side devices connected to network node 500 may access the wired network via wired interface 502 of network node 500. In some examples, one or more of the APs or other wired client-side devices connected to network node 500 may each draw power from network node 500 via the respective Ethernet cable and a Power over Ethernet (PoE) port of wired interface 502.

In examples where network node 500 comprises a session-based router that employs a stateful, session-based routing scheme, network node 500 may be configured to independently perform path selection and traffic engineering. The use of session-based routing may enable network node 500 to eschew the use of a centralized controller, such as an SDN controller, to perform path selection and traffic engineering, and eschew the use of tunnels. In some examples, network node 500 may implement session-based routing as Secure Vector Routing (SVR), provided by Juniper Networks, Inc. In the case where network node 500 comprises a session-based router operating as a network gateway for a site of an enterprise network (e.g., router 187A of FIG. 1B), network node 500 may establish multiple peer paths (e.g., logical path 189 of FIG. 1B) over an underlying physical WAN (e.g., SD-WAN 177 of FIG. 1B) with one or more other session-based routers operating as network gateways for other sites of the enterprise network (e.g., router 187B of FIG. 1B). Network node 500, operating as a session-based router, may collect data at a peer path level, and report the peer path data to NMS 130.

In examples where network node 500 comprises a packet-based router, network node 500 may employ a packet- or flow-based routing scheme to forward packets according to defined network paths, e.g., established by a centralized controller that performs path selection and traffic engineering. In the case where network node 500 comprises a packet-based router operating as a network gateway for a site of an enterprise network (e.g., router 187A of FIG. 1B), network node 500 may establish multiple tunnels (e.g., logical path 189 of FIG. 1B) over an underlying physical WAN (e.g., SD-WAN 177 of FIG. 1B) with one or more other packet-based routers operating as network gateways for other sites of the enterprise network (e.g., router 187B of FIG. 1B). Network node 500, operating as a packet-based router, may collect data at a tunnel level, and the tunnel data may be retrieved by NMS 130 via an API or an open configuration protocol or the tunnel data may be reported to NMS 130 by NMS agent 544 or other module running on network node 500.

The data collected and reported by network node 500 may include periodically-reported data and event-driven data. Network node 500 is configured to collect logical path statistics via bidirectional forwarding detection (BFD) probing and data extracted from messages and/or counters at the logical path (e.g., peer path or tunnel) level. In some examples, network node 500 is configured to collect statistics and/or sample other data according to a first periodic interval, e.g., every 3 seconds, every 5 seconds, etc. Network node 500 may store the collected and sampled data as path data, e.g., in a buffer.

In some examples, network node 500 optionally includes an NMS agent 544. NMS agent 544 may periodically create a package of the statistical data according to a second periodic interval, e.g., every 3 minutes. The collected and sampled data periodically-reported in the package of statistical data may be referred to herein as "oc-stats." In some examples, the package of statistical data may also include details about clients connected to network node 500 and the associated client sessions. NMS agent 544 may then report the package of statistical data to NMS 130 in the cloud. In other examples, NMS 130 may request, retrieve, or otherwise receive the package of statistical data from network node 500 via an API, an open configuration protocol, or another of communication protocols. The package of statistical data created by NMS agent 544 or another module of network node 500 may include a header identifying network node 500 and the statistics and data samples for each of the logical paths from network node 500. In still other examples, NMS agent 544 reports event data to NMS 130 in the cloud in response to the occurrence of certain events at network node 500 as the events happen. The event-driven data may be referred to herein as "oc-events."

Figure 6:
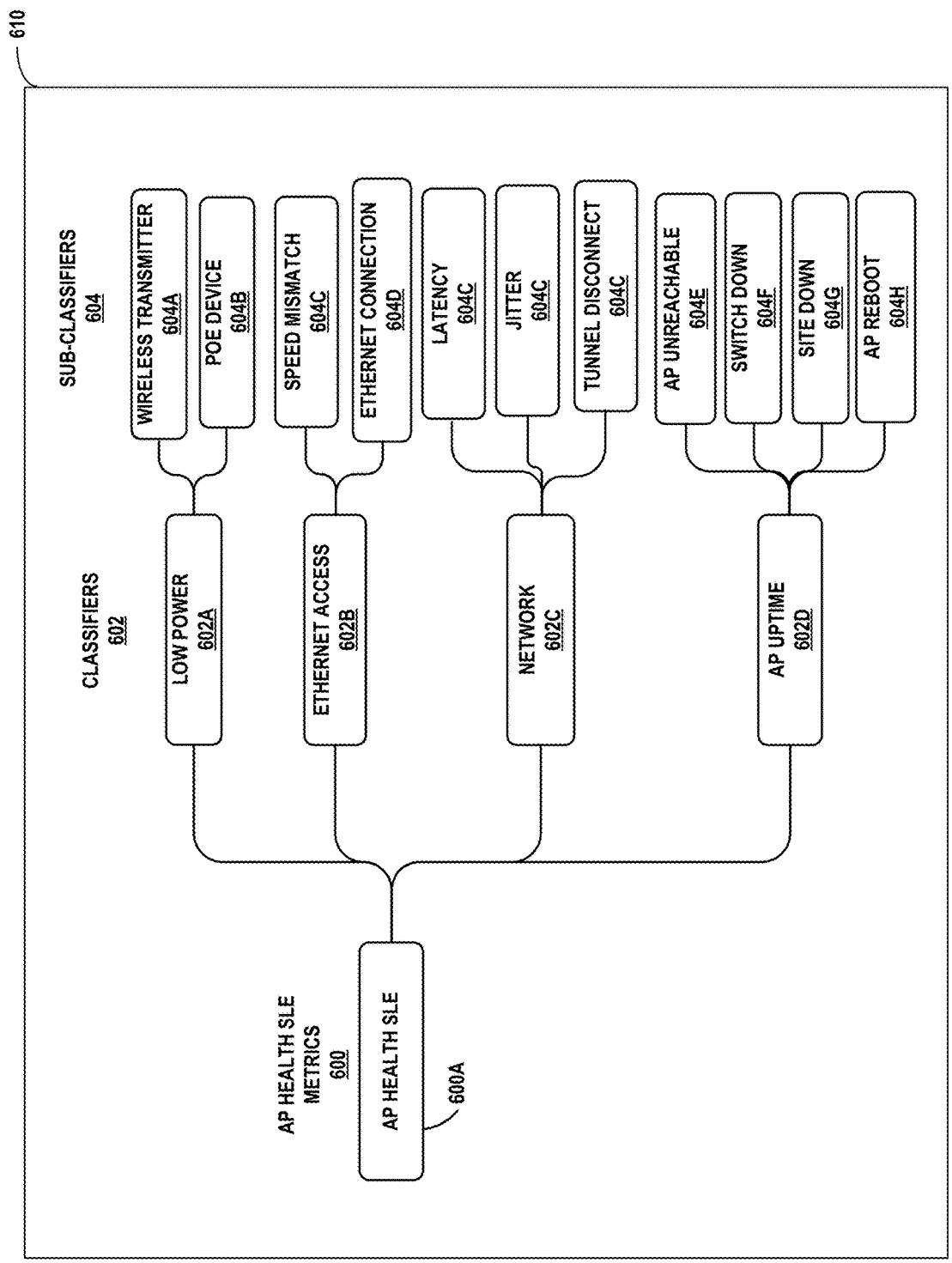
FIG. 6 illustrates a conceptual diagram of health issues of an access point attributed to classifiers or sub-classifiers of an AP health SLE, in accordance with one or more techniques of the disclosure.

FIG. 6 illustrates a conceptual diagram of health issues of an access point are attributed to classifiers or sub-classifiers of an AP health SLE, in accordance with one or more techniques of the disclosure. The conceptual diagram of FIG. 6 may represent, as one example, a user interface displaying the health issues of an access point that are attributed to classifiers or sub-classifiers of an AP health SLE. The example of FIG. 6 is an example user interface 610 including user interface elements 600A, 602A-602D, and 604A-604H representing a hierarchy of an example of AP Health SLE metric and its classifiers and sub-classifiers. In some examples, NMS 130/300 generates data representative of selectable user interface elements for one or more AP Health SLE metrics 600, one or more AP Health SLE classifiers 602, and one or more AP Health SLE sub-classifiers 604 for display. Upon selection of AP Health SLE 600A, NMS 130/300 may cause user interface 610 to display one or more classifier user interface elements 602A-602D corresponding to AP Health SLE user interface element 600A to provide a visual indication of the one or more classifiers that have been assigned as the health issue of an AP device. Upon selection of classifier user interface elements 602A-602D, NMS 130/300 may cause user interface 610 to display one or more sub-classifier user interface elements 604A-604H corresponding to the selection of classifier user interface elements 602A-602D. For example, upon a selection of low power classifier user interface element 602A, NMS 130/300 may display wireless transmitter user interface element 604A and/or PoE device user interface element 604B to provide a visual indication of the one or more sub-classifiers that have been assigned as the health issue of the AP device. Any of user interface elements 602A-602D and 604A-604H may include a percent representing how often the health issue of an AP device is attributed to a particular classifier or sub-classifier.

Figure 7:
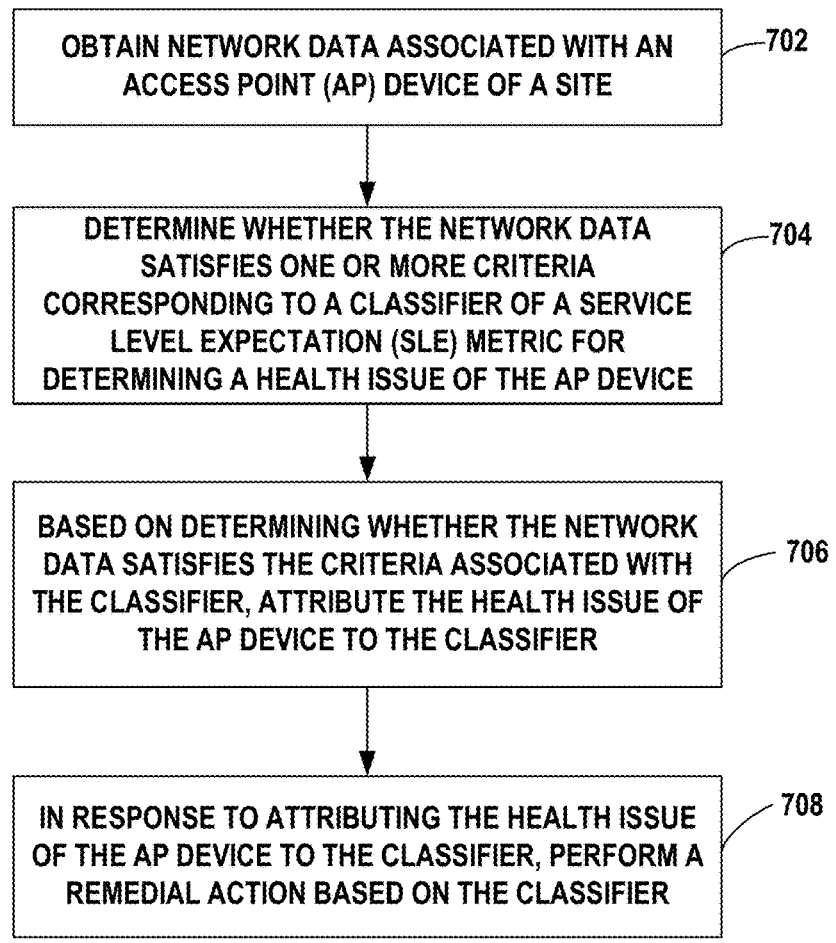
FIG. 7 is a flow chart illustrating an example operation of a network management system determining one or more health metrics for access points, in accordance with one or more techniques of this disclosure.

FIG. 7 is a flowchart illustrating an example operation 700 of an NMS determining one or more health metrics for access points, in accordance with one or more techniques of this disclosure. An NMS may obtain network data associated with an access point (AP) device of a site (702). For example, the NMS may obtain a list of network parameters and/or network events specific to an AP (or any other NAS device) and/or client devices currently or previously associated with an AP device. The NMS may determine whether the network data satisfies one or more criteria corresponding to a classifier of a service level expectation (SLE) metric for determining a health issue of the AP device (704). For example, the one or more criteria may be thresholds associated with classifiers (e.g., low power classifier, Ethernet access classifier, network classifier, AP uptime classifier) and/or sub-classifiers (e.g., wireless transmitter sub-classifier, PoE device sub-classifier, speed mismatch sub-classifier, Ethernet connection sub-classifier, latency sub-classifier, jitter sub-classifier, tunnel disconnect sub-classifier, AP uptime sub-classifiers, etc.). Based on the determination of whether the network data satisfies the criteria associated with the classifier, NMS may attribute the health issue of the AP device to the classifier (706). For example, NMS may determine that the network data of an AP device does not satisfy the criteria associated with a tunnel disconnect sub-classifier (e.g., tunnel configuration parameters between tunnel endpoints are mismatched) and in response, the NMS may attribute the health issue of the AP device to the tunnel disconnect sub-classifier. In response to attributing the health issue of the AP device to the classifier, NMS may perform a remedial action based on the classifier (708). For example, NMS may automatically take a corrective action to remedy a health issue by reconfiguring the AP device according to the classifier or sub-classifier attributed to the health issue.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A network management system (NMS) comprising:
one or more processors; and
a memory comprising instructions that when executed by the one or more processors, cause the one or more processors to:
obtain network data associated with an access point (AP) device of a site;
determine whether the network data satisfies one or more criteria corresponding to a classifier of a plurality of classifiers for a service level expectation (SLE) metric, wherein the classifier classifies the network data as indicative of a corresponding health issue of a plurality of health issues of the AP device and the classifier is associated with a corresponding remedial action of a plurality of remedial actions, wherein the one or more criteria corresponding to the classifier specifies an expected level of service to be provided by the AP device;
based on determining the network data satisfies the one or more criteria associated with the classifier, assign the classifier to the AP device to attribute the corresponding health issue to the AP device; and
perform, based on the classifier assigned to the AP device, the corresponding remedial action associated with the classifier.

2. The NMS of claim 1, wherein the classifier includes at least one of: a low power classifier, an Ethernet access classifier, a network classifier, or an AP uptime classifier.

3. The NMS of claim 2, wherein the low power classifier includes at least one of:
a wireless transmitter sub-classifier that includes a first criterion of the one or more criteria to determine whether the corresponding health issue of the AP device is due to the AP device having low power that is insufficient to power a wireless transmitter, or
a power over Ethernet (PoE) sub-classifier that includes a second criterion of the one or more criteria to determine whether the corresponding health issue of the AP device is due to the AP device having low power that is insufficient to power a PoE device.

4. The NMS of claim 2, wherein the Ethernet access classifier includes at least one of:
a speed mismatch sub-classifier that includes a first criterion of the one or more criteria to determine whether the corresponding health issue of the AP device is due to a discrepancy between a connection speed of the AP device and a capability of a switch, or an Ethernet connection sub-classifier that includes a second criterion of the one or more criteria to determine whether the corresponding health issue of the AP device is due to a faulty Ethernet connection.

5. The NMS of claim 2, wherein the network classifier includes at least one of:
   a latency sub-classifier that includes a first criterion of the one or more criteria to determine whether the corresponding health issue of the AP device is due to latency associated with the AP device,
   a jitter sub-classifier that includes a second criterion of the one or more criteria to determine whether the corresponding health issue of the AP device is due to jitter associated with the AP device, or
   a tunnel disconnect sub-classifier that includes a third criterion of the one or more criteria to determine whether the corresponding health issue of the AP device is due to a tunnel associated with the AP device.

6. The NMS of claim 2, wherein the AP uptime classifier includes at least one of:
   an AP unreachable sub-classifier that includes a first criterion of the one or more criteria to determine whether the corresponding health issue of the AP device is due to a loss of connectivity to the NMS,
   a switch down sub-classifier that includes a second criterion of the one or more criteria to determine whether the corresponding health issue of the AP device is due to a switch providing connectivity to the site being unreachable,
   a site down sub-classifier that includes a third criterion of the one or more criteria to determine whether the corresponding health issue of the AP device is due to all AP devices of the site being unreachable, or
   an AP reboot sub-classifier that includes a fourth criterion of the one or more criteria to determine whether the corresponding health issue of the AP device is due to a number of AP reboots of the AP device.

7. The NMS of claim 1, wherein the instructions further cause the one or more processors to:
   assign a sub-classifier associated with the classifier to the AP device; and
   in response to assigning the AP device to the sub-classifier, perform a remedial action of the plurality of remedial actions based on the sub-classifier.

8. The NMS of claim 1, wherein the instructions further cause the one or more processors to:
   obtain network data associated with the AP device in a plurality of time intervals;
   aggregate the network data into one or more buckets based on a particular duration of time comprising at least one time interval of the plurality of time intervals; and
   display, via a user interface, the one or more buckets and respective classifiers of the plurality of classifiers assigned to the AP device during the particular duration of time.

9. The NMS of claim 1, wherein the instructions further cause the one or more processors to:
   assign multiple classifiers from the plurality of classifiers to the AP device; and
   perform the corresponding remedial action according to a list associated with a hierarchy of the plurality of classifiers.

10. The NMS of claim 1, wherein to perform the corresponding remedial action associated with the classifier, the instructions cause the one or more processors to:
    output an indication of the classifier as a root cause of the corresponding health issue.

11. The NMS of claim 1, wherein the instructions further cause the one or more processors to:
    determine a number of times the classifier has been assigned to the AP device; and
    output an indication of the number of times the classifier has been assigned to the AP device.

12. A method comprising:
    obtaining, by a network management system (NMS), network data associated with an access point (AP) device of a site;
    determining, by the NMS, whether the network data satisfies one or more criteria corresponding to a classifier of a plurality of classifiers for a service level expectation (SLE) metric, wherein the classifier classifies the network data as indicative of a corresponding health issue of a plurality of health issues of the AP device and the classifier is associated with a corresponding remedial action of a plurality of remedial actions;
    based on determining the network data satisfies the one or more criteria associated with the classifier, assigning, by the NMS, the classifier to the AP device to attribute the corresponding health issue to the AP device; and
    performing, by the NMS and based on the classifier assigned to the AP device, the corresponding remedial action associated with the classifier.

13. The method of claim 12, wherein the classifier includes at least one of: a low power classifier, an Ethernet access classifier, a network classifier, or an AP uptime classifier.

14. The method of claim 12, further comprising:
    obtaining network data associated with the AP device in a plurality of time intervals;
    aggregating the network data into one or more buckets based on a particular duration of time comprising at least one time interval of the plurality of time intervals; and
    displaying, via a user interface, the one or more buckets and respective classifiers of the plurality of classifiers assigned to the AP device during the particular duration of time.

15. The method of claim 12, further comprising:
    assigning multiple classifiers from the plurality of classifiers to the AP device; and
    performing the corresponding remedial action according to a list associated with a hierarchy of the plurality of classifiers.

16. The method of claim 12, further comprising:
    determining a number of times the classifier has been assigned to the AP device; and
    output an indication of the number of times the classifier has been assigned to the AP device.

17. Non-transitory computer-readable storage media comprising instructions that, when executed by processing circuitry, cause the processing circuitry to:
    obtain network data associated with an access point (AP) device of a site;
    determine whether the network data satisfies one or more criteria corresponding to a classifier of a plurality of classifiers for a service level expectation (SLE) metric, wherein the classifier classifies the network data as indicative of a corresponding health issue of a plurality of health issues of the AP device and the classifier is associated with a corresponding remedial action of a plurality of remedial actions, wherein the one or more criteria corresponding to the classifier specifies an expected level of service to be provided by the AP device;

based on determining the network data satisfies the one or more criteria associated with the classifier, assign the classifier to the AP device to attribute the corresponding health issue to the AP device; and perform, based on the classifier assigned to the AP device, the corresponding remedial action associated with the classifier.

18. The non-transitory computer-readable storage media of claim 17, wherein the instructions further cause the processing circuitry to:

assign a sub-classifier associated with the classifier to the AP device; and perform a remedial action of the plurality of remedial actions based on the sub-classifier.

19. The non-transitory computer-readable storage media of claim 17, wherein the instructions further cause the processing circuitry to:

obtain network data associated with the AP device in a plurality of time intervals;

aggregate the network data into one or more buckets based on a particular duration of time comprising at least one time interval of the plurality of time intervals; and display, via a user interface, the one or more buckets and respective classifiers of the plurality of classifiers assigned to the AP device during the particular duration of time.

20. The non-transitory computer-readable storage media of claim 17, wherein the instructions further cause the processing circuitry to:

determine a number of times the classifier has been assigned to the AP device; and output an indication of the number of times the classifier has been assigned to the AP device.

* * * * *